(12) United States Patent
Kim et al.

(10) Patent No.: US 10,719,739 B1
(45) Date of Patent: Jul. 21, 2020

(54) LEARNING METHOD AND LEARNING DEVICE FOR LEARNING AUTOMATIC LABELING DEVICE CAPABLE OF AUTO-LABELING IMAGE OF BASE VEHICLE USING IMAGES OF NEARBY VEHICLES, AND TESTING METHOD AND TESTING DEVICE USING THE SAME

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

(*) Notice: Subject to any disclaimer, the term of this patent is extended or adjusted under 35 U.S.C. 154(b) by 0 days.

(21) Appl. No.: 16/739,201

(22) Filed: Jan. 10, 2020

Related U.S. Application Data

(60) Provisional application No. 62/799,484, filed on Jan. 31, 2019.

(51) Int. Cl.
*G06K 9/62* (2006.01)
*G06N 3/08* (2006.01)
*G06N 3/04* (2006.01)

(52) U.S. Cl.
CPC ........ *G06K 9/6264* (2013.01); *G06K 9/6259* (2013.01); *G06N 3/084* (2013.01); *G06N 3/04* (2013.01)

(58) Field of Classification Search
CPC ..... G06K 9/6264; G06K 9/6259; G06N 3/084
See application file for complete search history.

(56) References Cited

U.S. PATENT DOCUMENTS 10,345,822 B1 * 7/2019 Parchami ............. G05D 1/0251
10,565,476 B1 * 2/2020 Kim .................. G06K 9/00805
(Continued)

*Primary Examiner* — Utpal D Shah
(74) *Attorney, Agent, or Firm* — Husch Blackwell LLP

(57) ABSTRACT

A method for learning an automatic labeling device for auto-labeling a base image of a base vehicle using sub-images of nearby vehicles is provided. The method includes steps of: a learning device inputting the base image and the sub-images into previous trained dense correspondence networks to generate dense correspondences; and into encoders to output convolution feature maps, inputting the convolution feature maps into decoders to output deconvolution feature maps; with an integer k from 1 to n, generating a k-th adjusted deconvolution feature map by translating coordinates of a (k+1)-th deconvolution feature map using a k-th dense correspondence; generating a concatenated feature map by concatenating the 1-st deconvolution feature map and the adjusted deconvolution feature maps; and inputting the concatenated feature map into a masking layer to output a semantic segmentation image and instructing a 1-st loss layer to calculate 1-st losses and updating decoder weights and encoder weights.

28 Claims, 8 Drawing Sheets

(56) References Cited

U.S. PATENT DOCUMENTS

| | | | |
|---|---|---|---|
| 2019/0053178 A1* | 2/2019 | Merwaday | H04W 4/023 |
| 2019/0087672 A1* | 3/2019 | Wang | G06K 9/209 |
| 2019/0156485 A1* | 5/2019 | Pfeiffer | G06K 9/00791 |
| 2019/0188862 A1* | 6/2019 | Natroshvili | G06T 7/50 |
| 2019/0212749 A1* | 7/2019 | Chen | B62D 15/02 |
| 2019/0279005 A1* | 9/2019 | Ogale | G06N 3/0454 |
| 2019/0286153 A1* | 9/2019 | Rankawat | G06K 9/66 |
| 2019/0354842 A1* | 11/2019 | Louizos | G06N 3/0454 |
| 2019/0384304 A1* | 12/2019 | Towal | G06K 9/00791 |
| 2020/0026960 A1* | 1/2020 | Park | G05D 1/0088 |
| 2020/0033869 A1* | 1/2020 | Palanisamy | G05D 1/0088 |
| 2020/0051252 A1* | 2/2020 | Brown | G05D 1/0221 |

* cited by examiner

LEARNING METHOD AND LEARNING DEVICE FOR LEARNING AUTOMATIC LABELING DEVICE CAPABLE OF AUTO-LABELING IMAGE OF BASE VEHICLE USING IMAGES OF NEARBY VEHICLES, AND TESTING METHOD AND TESTING DEVICE USING THE SAME

CROSS REFERENCE TO RELATED APPLICATION

This application claims the benefit of priority to U.S. Provisional Patent Application No. 62/799,484, filed on Jan. 31, 2019, the entire contents of which are incorporated herein by reference.

FIELD OF THE DISCLOSURE

The present disclosure relates to a method and a device for auto-labeling images; and more particularly, to a learning method and a learning device for learning an automatic labeling device capable of auto-labeling the images of a base vehicle by using the images of nearby vehicles, and a testing method and a testing device using the same.

BACKGROUND OF THE DISCLOSURE

Recently, methods of performing object identification and the like making use of machine learning are being studied. As part of a family of machine learning methods, deep learning, which uses a neural network with several hidden layers between an input layer and an output layer, shows high performance in recognition.

And, the neural network using the deep learning generally learns through backpropagation using losses.

In order to perform such learning of a deep learning network, training data are needed in which tags, i.e., labels, are added to individual data points by labelers. Preparing these training data (i.e. classifying the data correctly) can be very labour-intensive, expensive and inconvenient, especially if a large amount of the training data is to be used and if the quality of the data pre-preparation is not consistently high. Conventional interactive labeling can be computationally expensive and fail to deliver good results.

Therefore, recently, auto-labeling which adds tags, i.e., labels, to a training image using a deep learning-based automatic labeling device is popular, and inspectors inspect auto-labeled training images to correct the tags or the labels.

However, in such a conventional method, a throughput of the inspectors is low as compared to the throughput of the automatic labeling device. Therefore, it takes a long time to generate true labels for entire training images. In order to improve the overall throughput, the number of the inspectors must be increased, resulting in an increase of the cost.

Also, it is difficult to acquire a large number of the inspectors skilled enough to keep up with the throughput of the automatic labeling device.

SUMMARY OF THE DISCLOSURE

It is an object of the present disclosure to solve all the aforementioned problems.

It is another object of the present disclosure to auto-label in real-time at least one base image acquired while a base vehicle is traveling.

It is still another object of the present disclosure to integrate the base image acquired from the base vehicle and one or more sub-images acquired from one or more nearby vehicles, to thereby auto-label integrated images, while the base vehicle and the nearby vehicles are traveling.

In accordance with one aspect of the present disclosure, there is provided a method for learning an automatic labeling device capable of auto-labeling an image of a base vehicle using images of nearby vehicles, including steps of: (a) if at least one base image of the base vehicle and a 1-st sub-image to an n-th sub-image of respective one or more nearby vehicles are acquired wherein n is an integer larger than 0, a learning device performing a process of inputting the base image and inputting each of the 1-st sub-image to the n-th sub-image respectively into a 1-st previous trained dense correspondence network to an n-th previous trained dense correspondence network, to thereby allow each of the 1-st to the n-th previous trained dense correspondence networks to respectively generate each of a 1-st dense correspondence to an n-th dense correspondence, wherein each of the 1-st dense correspondence to the n-th dense correspondence represents each of locations, on the base image, of each of a dense of the 1-st sub-image to a dense of the n-th sub-image, assuming that each of the dense of the 1-st sub-image to the dense of the n-th sub-image is translated to the base image; (b) the learning device performing (i) a process of inputting the base image and inputting each of the 1-st sub-image to the n-th sub-image respectively into each of a 1-st encoder to an (n+1)-th encoder, to thereby allow each of the 1-st encoder to the (n+1)-th encoder to respectively output a 1-st convolution feature map to an (n+1)-th convolution feature map by applying at least one convolution operation to the base image and each of the 1-st sub-image to the n-th sub-image respectively, (ii) a process of inputting each of the 1-st convolution feature map to the (n+1)-th convolution feature map respectively into each of a 1-st decoder to an (n+1)-th decoder, to thereby allow each of the 1-st decoder to the (n+1)-th decoder to respectively output each of a 1-st deconvolution feature map to an (n+1)-th deconvolution feature map by applying at least one deconvolution operation to each of the 1-st convolution feature map to the (n+1)-th convolution feature map respectively, (iii) supposing that an integer k ranges from 1 to n, a process of generating a k-th adjusted deconvolution feature map by translating coordinates of a (k+1)-th deconvolution feature map to coordinates of the 1-st deconvolution feature map by referring to a k-th dense correspondence, to thereby generate a 1-st adjusted deconvolution feature map to an n-th adjusted deconvolution feature map, and (iv) a process of generating at least one concatenated feature map by concatenating the 1-st deconvolution feature map, and the 1-st adjusted deconvolution feature map to the n-th adjusted deconvolution feature map; and (c) the learning device performing a process of inputting the concatenated feature map into a masking layer, to thereby allow the masking layer to output at least one semantic segmentation image by applying at least one masking operation to the concatenated feature map, and a process of instructing a 1-st loss layer to calculate one or more 1-st losses by referring to the semantic segmentation image and its corresponding at least one segmentation GT, and updating each of decoder weights of the 1-st decoder to the (n+1)-th decoder and each of encoder weights of the 1-st encoder to the (n+1)-th encoder via backpropagation using the 1-st losses such that the 1-st losses are minimized.

As one example, the learning device instructs each of the 1-st to the n-th previous trained dense correspondence networks to perform (i) a process of inputting the base image into each of 1-st sub-encoders respectively corresponding to each of the 1-st to the n-th previous trained dense correspondence networks, to thereby allow each of the 1-st sub-encoders to respectively generate each of 1-st sub-convolution feature maps by applying the convolution operation to the base image, (ii) a process of inputting each of the 1-st to the n-th sub-images into each of 2-nd sub-encoders respectively corresponding to each of the 1-st to the n-th previous trained dense correspondence networks, to thereby allow each of the 2-nd sub-encoders to respectively generate each of 2-nd sub-convolution feature maps by applying the convolution operation to each of the 1-st to the n-th sub-images respectively, (iii) a process of concatenating each of the 1-st sub-convolution feature maps and each of the 2-nd sub-convolution feature maps, to thereby generate each of the 1-st to the n-th sub-concatenated feature maps, (iv) a process of inputting each of the 1-st to the n-th sub-concatenated feature maps respectively into each of sub-decoders respectively corresponding to each of the 1-st to the n-th previous trained dense correspondence networks, to thereby allow each of the sub-decoders to respectively generate each of a 1-st to an n-th sub-deconvolution feature maps by applying the deconvolution operation to each of the 1-st to the n-th sub-concatenated feature maps respectively, and (v) a process of inputting each of the 1-st to the n-th sub-deconvolution feature maps respectively into each of regressors respectively corresponding to each of the 1-st to the n-th previous trained dense correspondence networks, to thereby allow each of the regressors to respectively output each of the 1-st to the n-th dense correspondences by applying at least one regression operation to each of the 1-st to the n-th dense correspondences respectively.

As one example, each of the 1-st to the n-th previous trained dense correspondence networks has been learned by a sub-learning device, to respectively output each of the 1-st to the n-th dense correspondences, and wherein, if at least one 1-st training image and at least one 2-nd training image are acquired, the sub-learning device performs (i) a process of inputting the 1-st training image into each of the 1-st sub-encoders, to thereby allow each of the 1-st sub-encoders to respectively generate each of 1-st sub-convolution feature maps for training by applying the convolution operation to the 1-st training image respectively, (ii) a process of inputting the 2-nd training image into each of the 2-nd sub-encoders, to thereby allow each of the 2-nd sub-encoders to respectively generate each of 2-nd sub-convolution feature maps for training by applying the convolution operation to the 2-nd training image, (iii) a process of concatenating each of the 1-st sub-convolution feature maps for training and each of the 2-nd sub-convolution feature maps for training, to thereby generate each of sub-concatenated feature maps for training, (iv) a process of inputting each of the sub-concatenated feature maps for training respectively into each of the sub-decoders, to thereby allow each of the sub-decoders to respectively generate each of sub-deconvolution feature maps for training by applying the deconvolution operation to each of the sub-concatenated feature maps for training respectively, (v) a process of inputting each of the sub-deconvolution feature maps for training into each of the regressors, to thereby allow each of the regressors to respectively output each of dense correspondences for training wherein each of the dense correspondence for training represents each of locations, on the 1-st training image, of each of a dense of the 2-nd training image, assuming that the dense of the 2-nd training image is translated to the 1-st training image, and (vi) a process of instructing a 2-nd loss layer to calculate one or more 2-nd losses by referring to the dense correspondences for training and their dense correspondence GTs, and updating each of sub-decoder weights of each of the sub-decoders and each of sub-encoder weights of each of the 1-st sub-encoders and the 2-nd sub-encoders via backpropagation using the 2-nd losses.

As one example, each of the 1-st sub-encoders and each of the 2-nd sub-encoders share their sub-encoder weights.

As one example, each of the 1-st to the n-th dense correspondences includes information representing each pixel of each of the 1-st to the n-th sub-images corresponds to each certain pixel of the base image.

As one example, each of the 1-st to the n-th dense correspondences includes information corresponding to at least one location of at least one externally expanding area of the base image, if each pixel of each of the 1-st to the n-th sub-images fails to correspond to any pixel of the base image.

As one example, the 1-st encoder to the (n+1)-th encoder share their encoder weights, and wherein the 1-st decoder to the (n+1)-th decoder share their decoder weights.

In accordance with another aspect of the present disclosure, there is provided a method for testing an automatic labeling device capable of auto-labeling an image of a base vehicle using an image of a nearby vehicle, including steps of: (a) on condition that a learning device has performed (1) if at least one base image for training of a base vehicle for training and a 1-st sub-image for training to an n-th sub-image for training of respective one or more nearby vehicles for training are acquired wherein n is an integer larger than 0, a process of inputting the base image for training and inputting each of the 1-st sub-image for training to the n-th sub-image for training respectively into a 1-st previous trained dense correspondence network to an n-th previous trained dense correspondence network, to thereby allow each of the 1-st to the n-th previous trained dense correspondence networks to respectively generate each of a 1-st dense correspondence for training to an n-th dense correspondence for training, wherein each of the 1-st dense correspondence for training to the n-th dense correspondence for training represents each of locations, on the base image for training, of each of a dense of the 1-st sub-image for training to a dense of the n-th sub-image for training, assuming that each of the dense of the 1-st sub-image for training to the dense of the n-th sub-image for training is translated to the base image for training, (2) (i) a process of inputting the base image for training and inputting each of the 1-st sub-image for training to the n-th sub-image for training respectively into each of a 1-st encoder to an (n+1)-th encoder, to thereby allow each of the 1-st encoder to the (n+1)-th encoder to respectively output a 1-st convolution feature map for training to an (n+1)-th convolution feature map for training by applying at least one convolution operation to the base image for training and each of the 1-st sub-image for training to the n-th sub-image for training respectively, (ii) a process of inputting each of the 1-st convolution feature map for training to the (n+1)-th convolution feature map for training respectively into each of a 1-st decoder to an (n+1)-th decoder, to thereby allow each of the 1-st decoder to the (n+1)-th decoder to respectively output each of a 1-st deconvolution feature map for training to an (n+1)-th deconvolution feature map for training by applying at least one deconvolution operation to each of the 1-st convolution feature map for training to the (n+1)-th convolution feature map for training respectively, (iii) supposing that an integer k ranges from 1 to n, a process of generating a k-th adjusted deconvolution feature map for training by translating coordinates of a (k+1)-th deconvolution feature map for training to coordinates of the 1-st deconvolution feature map for training by referring to a k-th dense correspondence for training, to thereby generate a 1-st adjusted deconvolution feature map for training to an n-th adjusted deconvolution feature map for training, and (iv) a process of generating at least one concatenated feature map for training by concatenating the 1-st deconvolution feature map for training, and the 1-st adjusted deconvolution feature map for training to the n-th adjusted deconvolution feature map for training and (3) a process of inputting the concatenated feature map for training into a masking layer, to thereby allow the masking layer to output at least one semantic segmentation image for training by applying at least one masking operation to the concatenated feature map for training, and a process of instructing a 1-st loss layer to calculate one or more 1-st losses by referring to the semantic segmentation image for training and its corresponding at least one segmentation GT, and updating each of decoder weights of the 1-st decoder to the (n+1)-th decoder and each of encoder weights of the 1-st encoder to the (n+1)-th encoder via backpropagation using the 1-st losses such that the 1-st losses are minimized, a testing device, if at least one base image for testing of a base vehicle for testing and a 1-st sub-image for testing to an n-th sub-image for testing of respective one or more nearby vehicles for testing are acquired, performing a process of inputting the base image for testing and inputting each of the 1-st sub-image for testing to the n-th sub-image for testing respectively into the 1-st previous trained dense correspondence network to the n-th previous trained dense correspondence network, to thereby allow each of the 1-st to the n-th previous trained dense correspondence networks to respectively generate each of a 1-st dense correspondence for testing to an n-th dense correspondence for testing, wherein each of the 1-st dense correspondence for testing to the n-th dense correspondence for testing represents each of locations, on the base image for testing, of each of a dense of the 1-st sub-image for testing to a dense of the n-th sub-image for testing, assuming that each of the dense of the 1-st sub-image for testing to the dense of the n-th sub-image for testing is translated to the base image for testing; (b) the testing device performing (i) a process of inputting the base image for testing and inputting each of the 1-st sub-image for testing to the n-th sub-image for testing respectively into each of the 1-st encoder to the (n+1)-th encoder, to thereby allow each of the 1-st encoder to the (n+1)-th encoder to respectively output a 1-st convolution feature map for testing to an (n+1)-th convolution feature map for testing by applying the convolution operation to the base image for testing and each of the 1-st sub-image for testing to the n-th sub-image for testing respectively, (ii) a process of inputting each of the 1-st convolution feature map for testing to the (n+1)-th convolution feature map for testing respectively into the 1-st decoder to the (n+1)-th decoder, to thereby allow the 1-st decoder to the (n+1)-th decoder to respectively output a 1-st deconvolution feature map for testing to an (n+1)-th deconvolution feature map for testing by applying the deconvolution operation to each of the 1-st convolution feature map for testing to the (n+1)-th convolution feature map for testing respectively, (iii) supposing that an integer k ranges from 1 to n, a process of generating a k-th adjusted deconvolution feature map for testing by translating coordinates of a (k+1)-th deconvolution feature map for testing to coordinates of the 1-st deconvolution feature map for testing by referring to a k-th dense correspondence for testing, to thereby generate a 1-st adjusted deconvolution feature map for testing to an n-th adjusted deconvolution feature map for testing, and (iv) a process of generating at least one concatenated feature map for testing by concatenating the 1-st deconvolution feature map for testing, and the 1-st adjusted deconvolution feature map for testing to the n-th adjusted deconvolution feature map for testing; and (c) the testing device performing a process of inputting the concatenated feature map for testing into the masking layer, to thereby allow the masking layer to output at least one semantic segmentation image for testing by applying the masking operation to the concatenated feature map for testing.

As one example, the testing device instructs each of the 1-st to the n-th previous trained dense correspondence networks to perform (i) a process of inputting the base image for testing into each of 1-st sub-encoders respectively corresponding to each of the 1-st to the n-th previous trained dense correspondence networks, to thereby allow each of the 1-st sub-encoders to respectively generate each of 1-st sub-convolution feature maps for testing by applying the convolution operation to the base image for testing, (ii) a process of inputting each of the 1-st to the n-th sub-images for testing into each of 2-nd sub-encoders respectively corresponding to each of the 1-st to the n-th previous trained dense correspondence networks, to thereby allow each of the 2-nd sub-encoders to respectively generate each of 2-nd sub-convolution feature maps for testing by applying the convolution operation to each of the 1-st to the n-th sub-images for testing respectively, (iii) a process of concatenating each of the 1-st sub-convolution feature maps for testing and each of the 2-nd sub-convolution feature maps for testing, to thereby generate each of the 1-st to the n-th sub-concatenated feature maps for testing, (iv) a process of inputting each of the 1-st to the n-th sub-concatenated feature maps for testing respectively into each of sub-decoders corresponding to each of the 1-st to the n-th previous trained dense correspondence networks, to thereby allow each of the sub-decoders to respectively generate each of a 1-st to an n-th sub-deconvolution feature maps for testing by applying the deconvolution operation to each of the 1-st to the n-th sub-concatenated feature maps for testing respectively, and (v) a process of inputting each of the 1-st to the n-th sub-deconvolution feature maps for testing respectively into each of regressors respectively corresponding to each of the 1-st to the n-th previous trained dense correspondence networks, to thereby allow each of the regressors to respectively output each of the 1-st to the n-th dense correspondences for testing by applying at least one regression operation to each of the 1-st to the n-th dense correspondences for testing respectively.

As one example, each of the 1-st to the n-th previous trained dense correspondence networks has been learned by a sub-learning device, to respectively output each of the 1-st to the n-th dense correspondences for testing, and wherein, if at least one 1-st training image and at least one 2-nd training image are acquired, the sub-learning device performs (i) a process of inputting the 1-st training image into each of the 1-st sub-encoders, to thereby allow each of the 1-st sub-encoders to respectively generate each of 1-st sub-convolution feature maps for training by applying the convolution operation to the 1-st training image, (ii) a process of inputting the 2-nd training image into each of the 2-nd sub-encoders, to thereby allow each of the 2-nd sub-encoders to respectively generate each of 2-nd sub-convolution feature maps for training by applying the convolution operation to the 2-nd training image, (iii) a process of concatenating each of the 1-st sub-convolution feature maps for training and each of the 2-nd sub-convolution feature maps for training, to thereby generate each of sub-concatenated feature maps for training, (iv) a process of inputting each of the sub-concatenated feature maps for training into each of the sub-decoders, to thereby allow each of the sub-decoders to respectively generate each of sub-deconvolution feature maps for training by applying the deconvolution operation to each of the sub-concatenated feature maps for training respectively, (v) a process of inputting each of the sub-deconvolution feature maps for training into each of the regressors, to thereby allow each of the regressors to respectively output each of dense correspondences for training wherein each of the dense correspondence represents each of locations, on the 1-st training image, of the dense of the 2-nd training image, assuming that the dense of the 2-nd training image is translated to the 1-st training image, and (vi) a process of instructing a 2-nd loss layer to calculate one or more 2-nd losses by referring to the dense correspondences for training and their dense correspondence GTs, and updating each of sub-decoder weights of each of the sub-decoders and each of sub-encoder weights of each of the 1-st sub-encoders and the 2-nd sub-encoders via backpropagation using the 2-nd losses.

As one example, each of the 1-st sub-encoders and each of the 2-nd sub-encoders share their sub-encoder weight.

As one example, each of the 1-st to the n-th dense correspondences for testing includes information representing each pixel of each of the 1-st to the n-th sub-images for testing corresponds to each certain pixel of the base image for testing.

As one example, each of the 1-st to the n-th dense correspondences for testing includes information corresponding to at least one location of at least one externally expanding area of the base image for testing, if each pixel of each of the 1-st to the n-th sub-images for testing fails to correspond to any pixel of the base image for testing.

As one example, the 1-st encoder to the (n+1)-th encoder share their encoder weight, and wherein the 1-st decoder to the (n+1)-th decoder share their decoder weight.

In accordance with one aspect of the present disclosure, there is provided a learning device for learning an automatic labeling device capable of auto-labeling an image of a base vehicle using images of nearby vehicles, including: at least one memory that stores instructions; and at least one processor configured to execute the instructions to perform or support another device to perform: (I) if at least one base image of the base vehicle and a 1-st sub-image to an n-th sub-image of respective one or more nearby vehicles are acquired wherein n is an integer larger than 0, a process of inputting the base image and inputting each of the 1-st sub-image to the n-th sub-image respectively into a 1-st previous trained dense correspondence network to an n-th previous trained dense correspondence network, to thereby allow each of the 1-st to the n-th previous trained dense correspondence networks to respectively generate each of a 1-st dense correspondence to an n-th dense correspondence, wherein each of the 1-st dense correspondence to the n-th dense correspondence represents each of locations, on the base image, of each of a dense of the 1-st sub-image to a dense of the n-th sub-image, assuming that each of the dense of the 1-st sub-image to the dense of the n-th sub-image is translated to the base image, (II) (i) a process of inputting the base image and inputting each of the 1-st sub-image to the n-th sub-image respectively into each of a 1-st encoder to an (n+1)-th encoder, to thereby allow each of the 1-st encoder to the (n+1)-th encoder to respectively output a 1-st convolution feature map to an (n+1)-th convolution feature map by applying at least one convolution operation to the base image and each of the 1-st sub-image to the n-th sub-image respectively, (ii) a process of inputting each of the 1-st convolution feature map to the (n+1)-th convolution feature map respectively into each of a 1-st decoder to an (n+1)-th decoder, to thereby allow each of the 1-st decoder to the (n+1)-th decoder to respectively output each of a 1-st deconvolution feature map to an (n+1)-th deconvolution feature map by applying at least one deconvolution operation to each of the 1-st convolution feature map to the (n+1)-th convolution feature map respectively, (iii) supposing that an integer k ranges from 1 to n, a process of generating a k-th adjusted deconvolution feature map by translating coordinates of a (k+1)-th deconvolution feature map to coordinates of the 1-st deconvolution feature map by referring to a k-th dense correspondence, to thereby generate a 1-st adjusted deconvolution feature map to an n-th adjusted deconvolution feature map, and (iv) a process of generating at least one concatenated feature map by concatenating the 1-st deconvolution feature map, and the 1-st adjusted deconvolution feature map to the n-th adjusted deconvolution feature map, and (III) a process of inputting the concatenated feature map into a masking layer, to thereby allow the masking layer to output at least one semantic segmentation image by applying at least one masking operation to the concatenated feature map, and a process of instructing a 1-st loss layer to calculate one or more 1-st losses by referring to the semantic segmentation image and its corresponding at least one segmentation GT, and updating each of decoder weights of the 1-st decoder to the (n+1)-th decoder and each of encoder weights of the 1-st encoder to the (n+1)-th encoder via backpropagation using the 1-st losses such that the 1-st losses are minimized.

As one example, the processor instructs each of the 1-st to the n-th previous trained dense correspondence networks to perform (i) a process of inputting the base image into each of 1-st sub-encoders respectively corresponding to each of the 1-st to the n-th previous trained dense correspondence networks, to thereby allow each of the 1-st sub-encoders to respectively generate each of 1-st sub-convolution feature maps by applying the convolution operation to the base image, (ii) a process of inputting each of the 1-st to the n-th sub-images into each of 2-nd sub-encoders respectively corresponding to each of the 1-st to the n-th previous trained dense correspondence networks, to thereby allow each of the 2-nd sub-encoders to respectively generate each of 2-nd sub-convolution feature maps by applying the convolution operation to each of the 1-st to the n-th sub-images respectively, (iii) a process of concatenating each of the 1-st sub-convolution feature maps and each of the 2-nd sub-convolution feature maps, to thereby generate each of the 1-st to the n-th sub-concatenated feature maps, (iv) a process of inputting each of the 1-st to the n-th sub-concatenated feature maps respectively into each of sub-decoders respectively corresponding to each of the 1-st to the n-th previous trained dense correspondence networks, to thereby allow each of the sub-decoders to respectively generate each of a 1-st to an n-th sub-deconvolution feature maps by applying the deconvolution operation to each of the 1-st to the n-th sub-concatenated feature maps respectively, and (v) a process of inputting each of the 1-st to the n-th sub-deconvolution feature maps respectively into each of regressors respectively corresponding to each of the 1-st to the n-th previous trained dense correspondence networks, to thereby allow each of the regressors to respectively output each of the 1-st to the n-th dense correspondences by applying at least one regression operation to each of the 1-st to the n-th dense correspondences respectively.

As one example, each of the 1-st to the n-th previous trained dense correspondence networks has been learned by a sub-learning device, to respectively output each of the 1-st to the n-th dense correspondences, and wherein, if at least one 1-st training image and at least one 2-nd training image are acquired, the sub-learning device performs (i) a process of inputting the 1-st training image into each of the 1-st sub-encoders, to thereby allow each of the 1-st sub-encoders to respectively generate each of 1-st sub-convolution feature maps for training by applying the convolution operation to the 1-st training image respectively, (ii) a process of inputting the 2-nd training image into each of the 2-nd sub-encoders, to thereby allow each of the 2-nd sub-encoders to respectively generate each of 2-nd sub-convolution feature maps for training by applying the convolution operation to the 2-nd training image, (iii) a process of concatenating each of the 1-st sub-convolution feature maps for training and each of the 2-nd sub-convolution feature maps for training, to thereby generate each of sub-concatenated feature maps for training, (iv) a process of inputting each of the sub-concatenated feature maps for training respectively into each of the sub-decoders, to thereby allow each of the sub-decoders to respectively generate each of sub-deconvolution feature maps for training by applying the deconvolution operation to each of the sub-concatenated feature maps for training respectively, (v) a process of inputting each of the sub-deconvolution feature maps for training into each of the regressors, to thereby allow each of the regressors to respectively output each of dense correspondences for training wherein each of the dense correspondence for training represents each of locations, on the 1-st training image, of each of a dense of the 2-nd training image, assuming that the dense of the 2-nd training image is translated to the 1-st training image, and (vi) a process of instructing a 2-nd loss layer to calculate one or more 2-nd losses by referring to the dense correspondences for training and their dense correspondence GTs, and updating each of sub-decoder weights of each of the sub-decoders and each of sub-encoder weights of each of the 1-st sub-encoders and the 2-nd sub-encoders via backpropagation using the 2-nd losses.

As one example, each of the 1-st sub-encoders and each of the 2-nd sub-encoders share their sub-encoder weights.

As one example, each of the 1-st to the n-th dense correspondences includes information representing each pixel of each of the 1-st to the n-th sub-images corresponds to each certain pixel of the base image.

As one example, each of the 1-st to the n-th dense correspondences includes information corresponding to at least one location of at least one externally expanding area of the base image, if each pixel of each of the 1-st to the n-th sub-images fails to correspond to any pixel of the base image.

As one example, the 1-st encoder to the (n+1)-th encoder share their encoder weights, and wherein the 1-st decoder to the (n+1)-th decoder share their decoder weights.

In accordance with another aspect of the present disclosure, there is provided a testing device for testing an automatic labeling device capable of auto-labeling an image of a base vehicle using an image of a nearby vehicle, including: at least one memory that stores instructions; and at least one processor configured to execute the instructions to perform or support another device to perform: (I) on condition that a learning device has performed (1) if at least one base image for training of a base vehicle for training and a 1-st sub-image for training to an n-th sub-image for training of respective one or more nearby vehicles for training are acquired wherein n is an integer larger than 0, a process of inputting the base image for training and inputting each of the 1-st sub-image for training to the n-th sub-image for training respectively into a 1-st previous trained dense correspondence network to an n-th previous trained dense correspondence network, to thereby allow each of the 1-st to the n-th previous trained dense correspondence networks to respectively generate each of a 1-st dense correspondence for training to an n-th dense correspondence for training, wherein each of the 1-st dense correspondence for training to the n-th dense correspondence for training represents each of locations, on the base image for training, of each of a dense of the 1-st sub-image for training to a dense of the n-th sub-image for training, assuming that each of the dense of the 1-st sub-image for training to the dense of the n-th sub-image for training is translated to the base image for training, (2) (i) a process of inputting the base image for training and inputting each of the 1-st sub-image for training to the n-th sub-image for training respectively into each of a 1-st encoder to an (n+1)-th encoder, to thereby allow each of the 1-st encoder to the (n+1)-th encoder to respectively output a 1-st convolution feature map for training to an (n+1)-th convolution feature map for training by applying at least one convolution operation to the base image for training and each of the 1-st sub-image for training to the n-th sub-image for training respectively, (ii) a process of inputting each of the 1-st convolution feature map for training to the (n+1)-th convolution feature map for training respectively into each of a 1-st decoder to an (n+1)-th decoder, to thereby allow each of the 1-st decoder to the (n+1)-th decoder to respectively output each of a 1-st deconvolution feature map for training to an (n+1)-th deconvolution feature map for training by applying at least one deconvolution operation to each of the 1-st convolution feature map for training to the (n+1)-th convolution feature map for training respectively, (iii) supposing that an integer k ranges from 1 to n, a process of generating a k-th adjusted deconvolution feature map for training by translating coordinates of a (k+1)-th deconvolution feature map for training to coordinates of the 1-st deconvolution feature map for training by referring to a k-th dense correspondence for training, to thereby generate a 1-st adjusted deconvolution feature map for training to an n-th adjusted deconvolution feature map for training, and (iv) a process of generating at least one concatenated feature map for training by concatenating the 1-st deconvolution feature map for training, and the 1-st adjusted deconvolution feature map for training to the n-th adjusted deconvolution feature map for training and (3) a process of inputting the concatenated feature map for training into a masking layer, to thereby allow the masking layer to output at least one semantic segmentation image for training by applying at least one masking operation to the concatenated feature map for training, and a process of instructing a 1-st loss layer to calculate one or more 1-st losses by referring to the semantic segmentation image for training and its corresponding at least one segmentation GT, and updating each of decoder weights of the 1-st decoder to the (n+1)-th decoder and each of encoder weights of the 1-st encoder to the (n+1)-th encoder via backpropagation using the 1-st losses such that the 1-st losses are minimized, (I-1) if at least one base image for testing of a base vehicle for testing and a 1-st sub-image for testing to an n-th sub-image for testing of respective one or more nearby vehicles for testing are acquired, a process of inputting the base image for testing and inputting each of the 1-st sub-image for testing to the n-th sub-image for testing respectively into the 1-st previous trained dense correspondence network to the n-th previous trained dense correspondence network, to thereby allow each of the 1-st to the n-th previous trained dense correspondence networks to respectively generate each of a 1-st dense correspondence for testing to an n-th dense correspondence for testing, wherein each of the 1-st dense correspondence for testing to the n-th dense correspondence for testing represents each of locations, on the base image for testing, of each of a dense of the 1-st sub-image for testing to a dense of the n-th sub-image for testing, assuming that each of the dense of the 1-st sub-image for testing to the dense of the n-th sub-image for testing is translated to the base image for testing, (II) (II-1) a process of inputting the base image for testing and inputting each of the 1-st sub-image for testing to the n-th sub-image for testing respectively into each of the 1-st encoder to the (n+1)-th encoder, to thereby allow each of the 1-st encoder to the (n+1)-th encoder to respectively output a 1-st convolution feature map for testing to an (n+1)-th convolution feature map for testing by applying the convolution operation to the base image for testing and each of the 1-st sub-image for testing to the n-th sub-image for testing respectively, (II-2) a process of inputting each of the 1-st convolution feature map for testing to the (n+1)-th convolution feature map for testing respectively into the 1-st decoder to the (n+1)-th decoder, to thereby allow the 1-st decoder to the (n+1)-th decoder to respectively output a 1-st deconvolution feature map for testing to an (n+1)-th deconvolution feature map for testing by applying the deconvolution operation to each of the 1-st convolution feature map for testing to the (n+1)-th convolution feature map for testing respectively, (II-3) supposing that an integer k ranges from 1 to n, a process of generating a k-th adjusted deconvolution feature map for testing by translating coordinates of a (k+1)-th deconvolution feature map for testing to coordinates of the 1-st deconvolution feature map for testing by referring to a k-th dense correspondence for testing, to thereby generate a 1-st adjusted deconvolution feature map for testing to an n-th adjusted deconvolution feature map for testing, and (II-4) a process of generating at least one concatenated feature map for testing by concatenating the 1-st deconvolution feature map for testing, and the 1-st adjusted deconvolution feature map for testing to the n-th adjusted deconvolution feature map for testing, and (III) a process of inputting the concatenated feature map for testing into the masking layer, to thereby allow the masking layer to output at least one semantic segmentation image for testing by applying the masking operation to the concatenated feature map for testing.

As one example, the processor instructs each of the 1-st to the n-th previous trained dense correspondence networks to perform (i) a process of inputting the base image for testing into each of 1-st sub-encoders respectively corresponding to each of the 1-st to the n-th previous trained dense correspondence networks, to thereby allow each of the 1-st sub-encoders to respectively generate each of 1-st sub-convolution feature maps for testing by applying the convolution operation to the base image for testing, (ii) a process of inputting each of the 1-st to the n-th sub-images for testing into each of 2-nd sub-encoders respectively corresponding to each of the 1-st to the n-th previous trained dense correspondence networks, to thereby allow each of the 2-nd sub-encoders to respectively generate each of 2-nd sub-convolution feature maps for testing by applying the convolution operation to each of the 1-st to the n-th sub-images for testing respectively, (iii) a process of concatenating each of the 1-st sub-convolution feature maps for testing and each of the 2-nd sub-convolution feature maps for testing, to thereby generate each of the 1-st to the n-th sub-concatenated feature maps for testing, (iv) a process of inputting each of the 1-st to the n-th sub-concatenated feature maps for testing respectively into each of sub-decoders corresponding to each of the 1-st to the n-th previous trained dense correspondence networks, to thereby allow each of the sub-decoders to respectively generate each of a 1-st to an n-th sub-deconvolution feature maps for testing by applying the deconvolution operation to each of the 1-st to the n-th sub-concatenated feature maps for testing respectively, and (v) a process of inputting each of the 1-st to the n-th sub-deconvolution feature maps for testing respectively into each of regressors respectively corresponding to each of the 1-st to the n-th previous trained dense correspondence networks, to thereby allow each of the regressors to respectively output each of the 1-st to the n-th dense correspondences for testing by applying at least one regression operation to each of the 1-st to the n-th dense correspondences for testing respectively.

As one example, each of the 1-st to the n-th previous trained dense correspondence networks has been learned by a sub-learning device, to respectively output each of the 1-st to the n-th dense correspondences for testing, and wherein, if at least one 1-st training image and at least one 2-nd training image are acquired, the sub-learning device performs (i) a process of inputting the 1-st training image into each of the 1-st sub-encoders, to thereby allow each of the 1-st sub-encoders to respectively generate each of 1-st sub-convolution feature maps for training by applying the convolution operation to the 1-st training image, (ii) a process of inputting the 2-nd training image into each of the 2-nd sub-encoders, to thereby allow each of the 2-nd sub-encoders to respectively generate each of 2-nd sub-convolution feature maps for training by applying the convolution operation to the 2-nd training image, (iii) a process of concatenating each of the 1-st sub-convolution feature maps for training and each of the 2-nd sub-convolution feature maps for training, to thereby generate each of sub-concatenated feature maps for training, (iv) a process of inputting each of the sub-concatenated feature maps for training into each of the sub-decoders, to thereby allow each of the sub-decoders to respectively generate each of sub-deconvolution feature maps for training by applying the deconvolution operation to each of the sub-concatenated feature maps for training respectively, (v) a process of inputting each of the sub-deconvolution feature maps for training into each of the regressors, to thereby allow each of the regressors to respectively output each of dense correspondences for training wherein each of the dense correspondence represents each of locations, on the 1-st training image, of the dense of the 2-nd training image, assuming that the dense of the 2-nd training image is translated to the 1-st training image, and (vi) a process of instructing a 2-nd loss layer to calculate one or more 2-nd losses by referring to the dense correspondences for training and their dense correspondence GTs, and updating each of sub-decoder weights of each of the sub-decoders and each of sub-encoder weights of each of the 1-st sub-encoders and the 2-nd sub-encoders via backpropagation using the 2-nd losses.

As one example, each of the 1-st sub-encoders and each of the 2-nd sub-encoders share their sub-encoder weight.

As one example, each of the 1-st to the n-th dense correspondences for testing includes information representing each pixel of each of the 1-st to the n-th sub-images for testing corresponds to each certain pixel of the base image for testing.

As one example, each of the 1-st to the n-th dense correspondences for testing includes information corresponding to at least one location of at least one externally expanding area of the base image for testing, if each pixel of each of the 1-st to the n-th sub-images for testing fails to correspond to any pixel of the base image for testing.

As one example, the 1-st encoder to the (n+1)-th encoder share their encoder weight, and wherein the 1-st decoder to the (n+1)-th decoder share their decoder weight.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
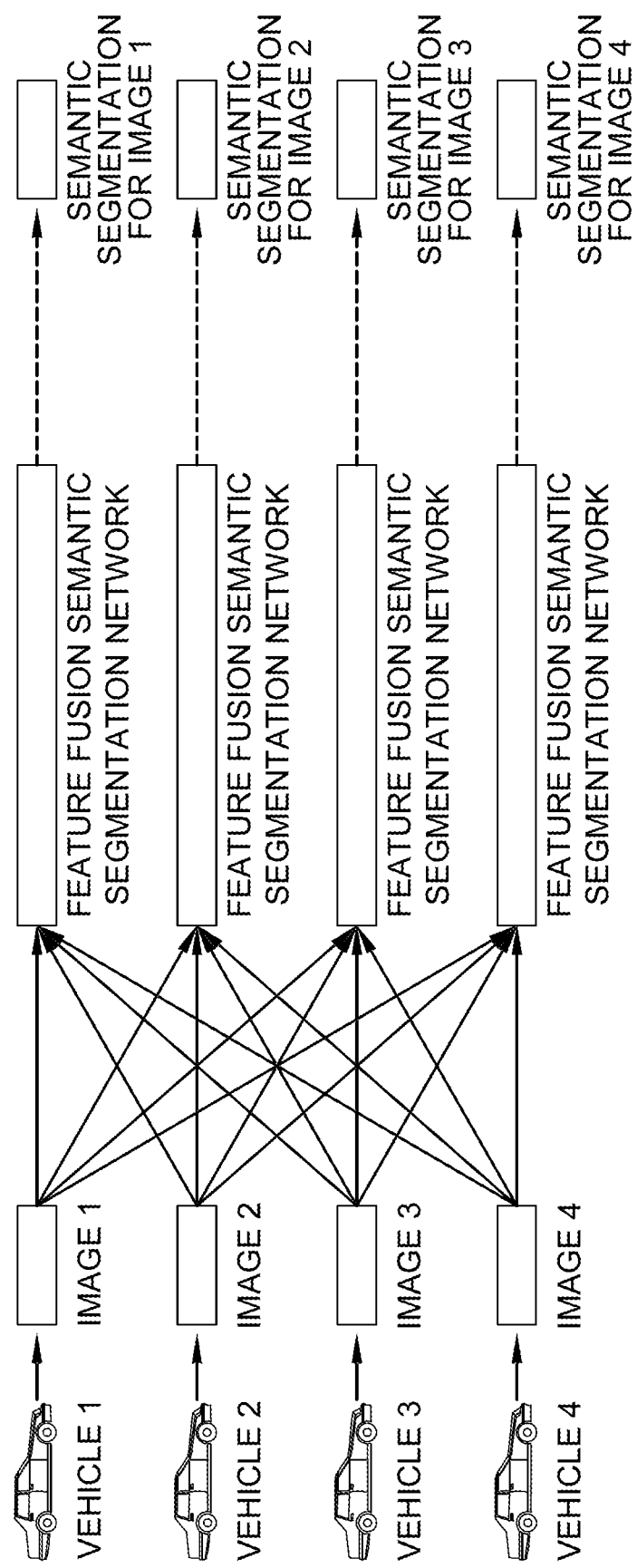
FIG. 1 is a drawing schematically illustrating a process of auto-labeling each base image of each base vehicle by using one or more sub-images of one or more nearby vehicles in accordance with one example of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

For reference, in the description below, the phrase "for training" or "training" is added for terms related to the learning process, and the phrase "for testing" or "testing" is added for terms related to the testing process, to avoid possible confusion.

To allow those skilled in the art to carry out the present disclosure easily, the example embodiments of the present disclosure by referring to attached diagrams will be explained in detail as shown below.

FIG. 1 is a drawing schematically illustrating a process of auto-labeling each base image of each base vehicle by using one or more sub-images of one or more nearby vehicles in accordance with one example of the present disclosure.

Herein, a size of the base image may be same as sizes of the sub-images, but the scope of the present disclosure is not limited thereto.

By referring to FIG. 1, vehicles traveling on a road may transmit and receive one or more video images of driving environment taken by each of one or more cameras mounted on each of the vehicles via V2V (vehicle to vehicle) communication.

And, each of automatic labeling devices installed on each of the vehicles, which receives the video images from its respective nearby vehicles, may output at least one semantic segmentation corresponding to its video images taken at said each of the vehicles by using the video images taken at its respective nearby vehicles via its own feature fusion semantic segmentation network, to thereby auto-label the video images taken at said each of the vehicles.

Figure 2:
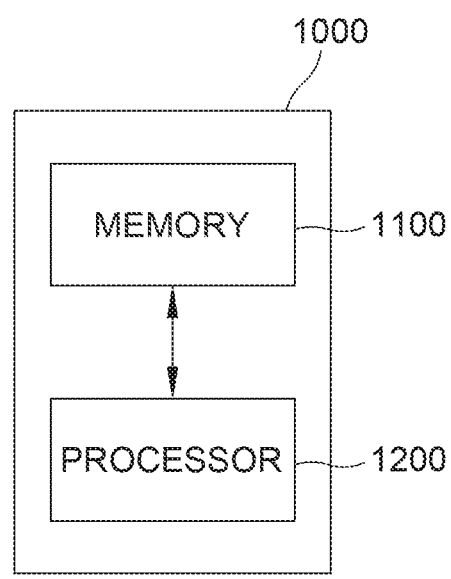
FIG. 2 is a drawing schematically illustrating a learning device for learning an automatic labeling device capable of auto-labeling the base image of the base vehicle by using the sub-images of the nearby vehicles in accordance with one example of the present disclosure.

Herein, four of the vehicles are exemplarily shown in FIG. 2, but the scope of the present disclosure is not limited thereto.

Also, each of the vehicles, that is, each of base vehicles, which acquires the video images from its respective nearby vehicles may share location sensors, etc. of its nearby vehicles by sensor fusion over V2X communication, to thereby use the video images taken from its nearby vehicles having perspectives different from a perspective of the base vehicle. That is, the base vehicle may acquire or support another device to acquire the video images of a specific location taken from different perspectives.

Thereafter, each of the automatic labeling devices on each of the vehicles may auto-label the video images taken at its own vehicle, using the semantic segmentation outputted from each of the feature fusion semantic segmentation networks.

FIG. 2 is a drawing schematically illustrating a learning device for learning the automatic labeling device for auto-labeling at least one base image taken from a base vehicle by using the sub-images taken from the nearby vehicles in accordance with one example of the present disclosure. By referring to FIG. 2, the learning device 1000 may include a memory 1100 for storing instructions to learn the automatic labeling device for auto-labeling the base image taken from the base vehicle by using the sub-images taken from the nearby vehicles and a processor 1200 for performing processes according to the instructions in the memory 1100 to learn the automatic labeling device for auto-labeling the base image taken from the base vehicle by using the sub-images taken from the nearby vehicles.

Specifically, the learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

A method for learning the automatic labeling device to be used for auto-labeling the base image taken from the base vehicle using the sub-images taken from the nearby vehicles by using the learning device 1000 in accordance with one example of the present disclosure is described by referring to FIG. 3 as follows.

First, if the base image of the base vehicle and a 1-st sub-image to an n-th sub-image of the nearby vehicles are acquired, the learning device 1000 may perform a process of inputting the base image and inputting each of the 1-st sub-image to the n-th sub-image respectively into a 1-st previous trained dense correspondence network 100_1 to an n-th previous trained dense correspondence network 100_$n$, to thereby allow each of the 1-st to the n-th previous trained dense correspondence networks to respectively generate each of a 1-st dense correspondence to an n-th dense correspondence. Herein, n may be an integer larger than 0. Further, each of the 1-st dense correspondence to the n-th dense correspondence represents each of locations, on the base image, of each of a dense of the 1-st sub-image to a dense of the n-th sub-image, assuming that each of the dense of the 1-st sub-image to the dense of the n-th sub-image is translated to the base image. Also, each of the dense of the 1-st sub-image to the dense of the n-th sub-image may represent each cluster of pixels where each object is estimated as located among pixels on each of the 1-st sub-image to the n-th sub-image.

That is, the base image and the 1-st sub-image may be inputted into the 1-st previous trained dense correspondence network 100_1, to thereby allow the 1-st previous trained dense correspondence network 100_1 to generate the 1-st dense correspondence, the base image and the 2-nd sub-image may be inputted into the 2-nd previous trained dense correspondence network 100_2, to thereby allow the 2-nd previous trained dense correspondence network 100_2 to generate the 2-nd dense correspondence, and similarly, the base image and the n-th sub-image may be inputted into the n-th previous trained dense correspondence network 100_$n$, to thereby allow the n-th previous trained dense correspondence network 100_$n$ to generate the n-th dense correspondence. And as a result, each of the 1-st previous trained dense correspondence network 100_1 to the n-th previous trained dense correspondence network 100_$n$ may generate its corresponding each of the 1-st dense correspondence to the n-th dense correspondence.

Herein, each of the 1-st to the n-th dense correspondences may include information representing that each pixel of each of the 1-st to the n-th sub-images corresponds to each certain pixel of the base image, that is, information on which pixel of the base image said each pixel of each of the 1-st to the n-th sub-images corresponds to. Meanwhile, if each pixel of each of the 1-st to the n-th sub-images fails to correspond to any pixel of the base image, each of the 1-st to the n-th dense correspondences may include information corresponding to at least one location of at least one externally expanding area of the base image. That is, each of the 1-st to the n-th dense correspondences may include relative coordinates (dx, dy) of every pixel, in each of the 1-st to the n-th sub-images, calculated on a basis of the base image, and if no corresponding pixel of the base image, where each pixel of each of the 1-st to the n-th sub-images is to be translated, is present, the relative coordinates may be represented as (image width, image height) corresponding to the location of the externally expanding area added to the base image.

And, by referring to FIG. 4, a process of each of the 1-st previous trained dense correspondence network 100_1 to the n-th previous trained dense correspondence network 100_n respectively generating each of the 1-st dense correspondence to the n-th dense correspondence is described in more detail as follows.

Each of the 1-st to the n-th previous trained dense correspondence networks 100 may perform (i) a process of inputting the base image into each of 1-st sub-encoders 110 respectively corresponding to each of the 1-st to the n-th previous trained dense correspondence networks, to thereby allow each of the 1-st sub-encoders 110 to respectively generate each of 1-st sub-convolution feature maps by applying at least one convolution operation to the base image, and (ii) a process of inputting each of the 1-st to the n-th sub-images respectively into each of 2-nd sub-encoders 120 corresponding to each of the 1-st to the n-th previous trained dense correspondence networks, to thereby allow each of the 2-nd sub-encoders 120 to respectively generate each of 2-nd sub-convolution feature maps by applying at least one convolution operation to each of the 1-st to the n-th sub-images, respectively. Herein, each of the 1-st sub-encoders 110 and each of the 2-nd sub-encoders 120 may include at least one convolutional layer and may down-sample the base image by applying at least one convolution operation. Also, each of the 1-st sub-encoders 110 and each of the 2-nd sub-encoders 120 may share their sub-encoder weights.

And, each of the 1-st to the n-th previous trained dense correspondence networks may concatenate each of the 1-st sub-convolution feature maps and each of the 2-nd sub-convolution feature maps, to thereby generate its corresponding each of a 1-st to an n-th sub-concatenated feature maps.

Thereafter, each of the 1-st to the n-th previous trained dense correspondence networks may perform a process of inputting each of the 1-st to the n-th sub-concatenated feature maps respectively into each of sub-decoders 130 corresponding to each of the 1-st to the n-th previous trained dense correspondence networks, to thereby allow each of the sub-decoders 130 to respectively generate each of a 1-st to an n-th sub-deconvolution feature maps by applying at least one deconvolution operation to each of the 1-st to the n-th sub-concatenated feature maps, respectively. Herein, each of the sub-decoders 130 may include at least one deconvolutional layer, and may up-sample each of the 1-st to the n-th sub-concatenated feature maps by applying at least one deconvolution operation.

And, each of the 1-st to the n-th previous trained dense correspondence networks may respectively input the 1-st to the n-th sub-deconvolution feature maps into corresponding regressors 140, to thereby allow each of the regressors 140 to respectively output each of the 1-st to the n-th dense correspondences.

Meanwhile, each of the 1-st to the n-th previous trained dense correspondence networks may have been learned by a sub-learning device, to output each of the 1-st to the n-th dense correspondences.

Figure 5:
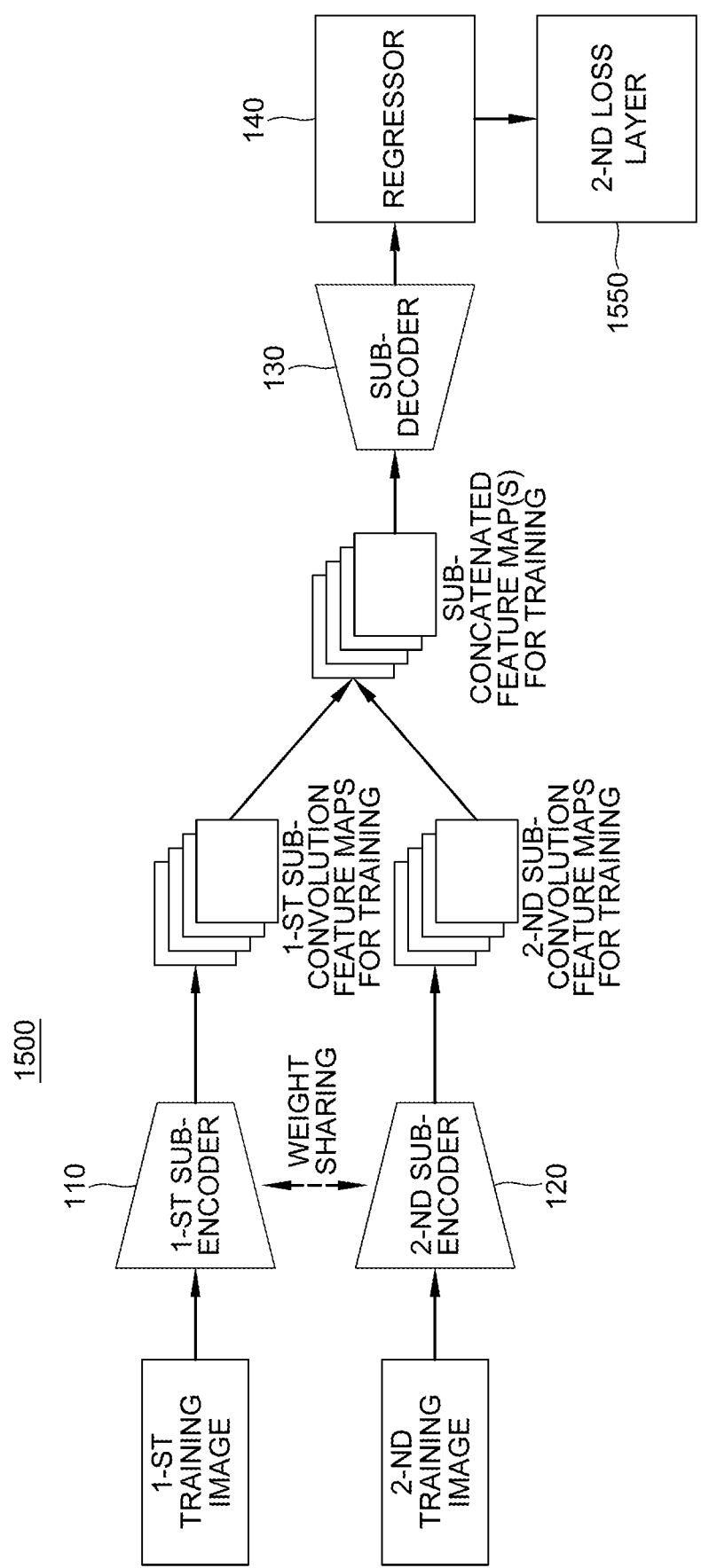
FIG. 5 is a drawing schematically illustrating a process of learning the previous trained dense correspondence network in the method for learning the automatic labeling device capable of auto-labeling the image of the base vehicle by using the images of the nearby vehicles in accordance with one example of the present disclosure.

As one example, by referring to FIG. 5, if at least one 1-st training image and at least one 2-nd training image are acquired, the sub-learning device 1500 may perform (i) a process of inputting the 1-st training image into each of the 1-st sub-encoders 110, to thereby allow each of the 1-st sub-encoders 110 to respectively generate each of 1-st sub-convolution feature maps for training by applying at least one convolution operation to the 1-st training image, and (ii) a process of inputting the 2-nd training image into each of the 2-nd sub-encoders 120, to thereby allow each of the 2-nd sub-encoders 120 to respectively generate each of 2-nd sub-convolution feature maps for training by applying at least one convolution operation to the 2-nd training image.

And, the sub-learning device 1500 may perform (iii) a process of concatenating each of the 1-st sub-convolution feature maps for training and each of the 2-nd sub-convolution feature maps for training, to thereby generate each of sub-concatenated feature maps for training, (iv) a process of inputting each of the sub-concatenated feature maps for training respectively into each of the sub-decoders 130, to thereby allow each of the sub-decoders 130 to respectively generate each of sub-deconvolution feature maps for training by applying at least one deconvolution operation to each of the sub-concatenated feature maps for training respectively, and (v) a process of inputting each of the sub-deconvolution feature maps for training respectively into each of the regressors 140, to thereby allow each of the regressors 140 to respectively output each of dense correspondences for training. Herein, each of the dense correspondences for training represents each of locations, on the 1-st training image, of a dense of the 2-nd training image, assuming that the dense of the 2-nd training image is translated to the 1-st training image. Also, the dense of the 2-nd training image may represent a cluster of pixels where an object for training is estimated as located among pixels on the 2-nd training image.

Thereafter, the sub-learning device 1500 may perform (vi) a process of instructing a 2-nd loss layer 1550 to calculate one or more 2-nd losses by referring to the dense correspondences for training and their dense correspondence GTs, and updating each of sub-decoder weights of each of the sub-decoders 130 and each of sub-encoder weights of each of the 1-st sub-encoders 110 and the 2-nd sub-encoders 120 via backpropagation using the 2-nd losses, and as a result, the sub-learning device 1500 may learn the 1-st to the n-th previous trained dense correspondence networks.

Next, by referring to FIG. 3 again, the learning device 1000 may perform (i) a process of inputting the base image and inputting each of the 1-st sub-image to the n-th sub-image respectively into each of a 1-st encoder 200_1 to an (n+1)-th encoder 200_(n+1), to thereby allow each of the 1-st encoder 200_1 to the (n+1)-th encoder 200_(n+1) to output each of a 1-st convolution feature map to an (n+1)-th convolution feature map by applying at least one convolution operation to the base image and each of the 1-st sub-image to the n-th sub-image, respectively, and (ii) a process of inputting each of the 1-st convolution feature map to the (n+1)-th convolution feature map respectively into each of a 1-st decoder 300_1 to an (n+1)-th decoder 300_(n+1), to thereby allow each of the 1-st decoder 300_1 to the (n+1)-th decoder 300_(n+1) to respectively output each of a 1-st deconvolution feature map to an (n+1)-th deconvolution feature map by applying at least one deconvolution operation to each of the 1-st convolution feature map to the (n+1)-th convolution feature map respectively. Herein, each of the 1-st encoder 200_1 to the (n+1)-th encoder 200_(n+1) may include at least one convolutional layer and may down-sample the base image and each of the 1-st to the (n+1)-th sub-images, by applying at least one convolution operation. And, each of the 1-st decoder 300_1 to the (n+1)-th decoder 300_(n+1) may include at least one deconvolutional layer and may up-sample each of the 1-st convolution feature map to the (n+1)-th convolution feature map, by applying at least one deconvolution operation. Also, each of the 1-st encoder 200_1 to the (n+1)-th encoder 200_($n$+1) may share their encoder weights, and each of the 1-st decoder 300_1 to the (n+1)-th decoder 300_($n$+1) may share their decoder weights.

And, supposing that an integer k ranges from 1 to n, the learning device 1000 may perform (iii) a process of generating a k-th adjusted deconvolution feature map by translating coordinates of a (k+1)-th deconvolution feature map to coordinates of the 1-st deconvolution feature map by referring to a k-th dense correspondence, to thereby generate a 1-st adjusted deconvolution feature map to an n-th adjusted deconvolution feature map, and (iv) a process of generating at least one concatenated feature map by concatenating the 1-st deconvolution feature map and the 1-st to the n-th adjusted deconvolution feature maps.

Thereafter, the learning device 1000 may perform a process of inputting the concatenated feature map into a masking layer 400, to thereby allow the masking layer 400 to output at least one semantic segmentation image by applying at least one masking operation to the concatenated feature map. Herein, the semantic segmentation image may result from adding information on the 1-st sub-image to the n-th sub-image onto the base image and segmenting an output therefrom, and may correspond to the auto-labeled base image.

Next, the learning device 1000 may perform a process of instructing a 1-st loss layer 500 to calculate one or more 1-st losses by referring to the semantic segmentation image and its corresponding at least one segmentation GT, and updating each of decoder weights of the 1-st decoder 300_1 to the (n+1)-th decoder 300_($n$+1) and each of encoder weights of the 1-st encoder 200_1 to the (n+1)-th encoder 200_($n$+1) via backpropagation using the 1-st losses such that the 1-st losses are minimized, and as a result, the learning device 1000 may learn the automatic labeling device to be used for auto-labeling the base image of the base vehicle by using the sub-images of the nearby vehicles.

Figure 6:
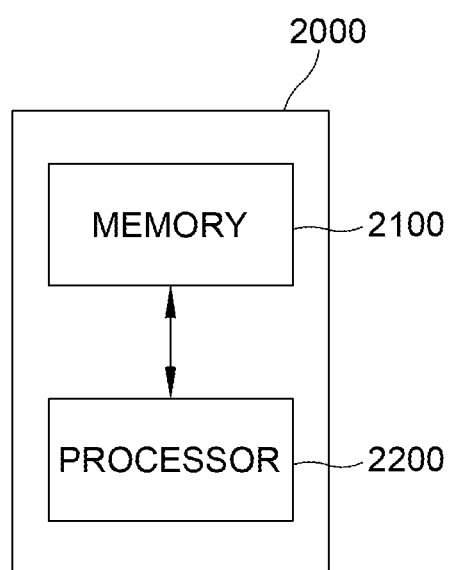
FIG. 6 is a drawing schematically illustrating a testing device for testing the automatic labeling device capable of auto-labeling the base image of the base vehicle by using the sub-images of the nearby vehicles in accordance with one example of the present disclosure.

FIG. 6 is a drawing schematically illustrating a testing device for testing the automatic labeling device for auto-labeling the base image taken from the base vehicle by using the sub-images taken from the nearby vehicles in accordance with one example of the present disclosure. By referring to FIG. 6, the testing device 2000 may include a memory 2100 for storing instructions to test the automatic labeling device for auto-labeling the base image taken from the base vehicle by using the sub-images taken from the nearby vehicles and a processor 2200 for performing processes according to the instructions in the memory 2100 to test the automatic labeling device for auto-labeling the base image taken from the base vehicle by using the sub-images taken from the nearby vehicles.

Specifically, the testing device 2000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Figure 7:
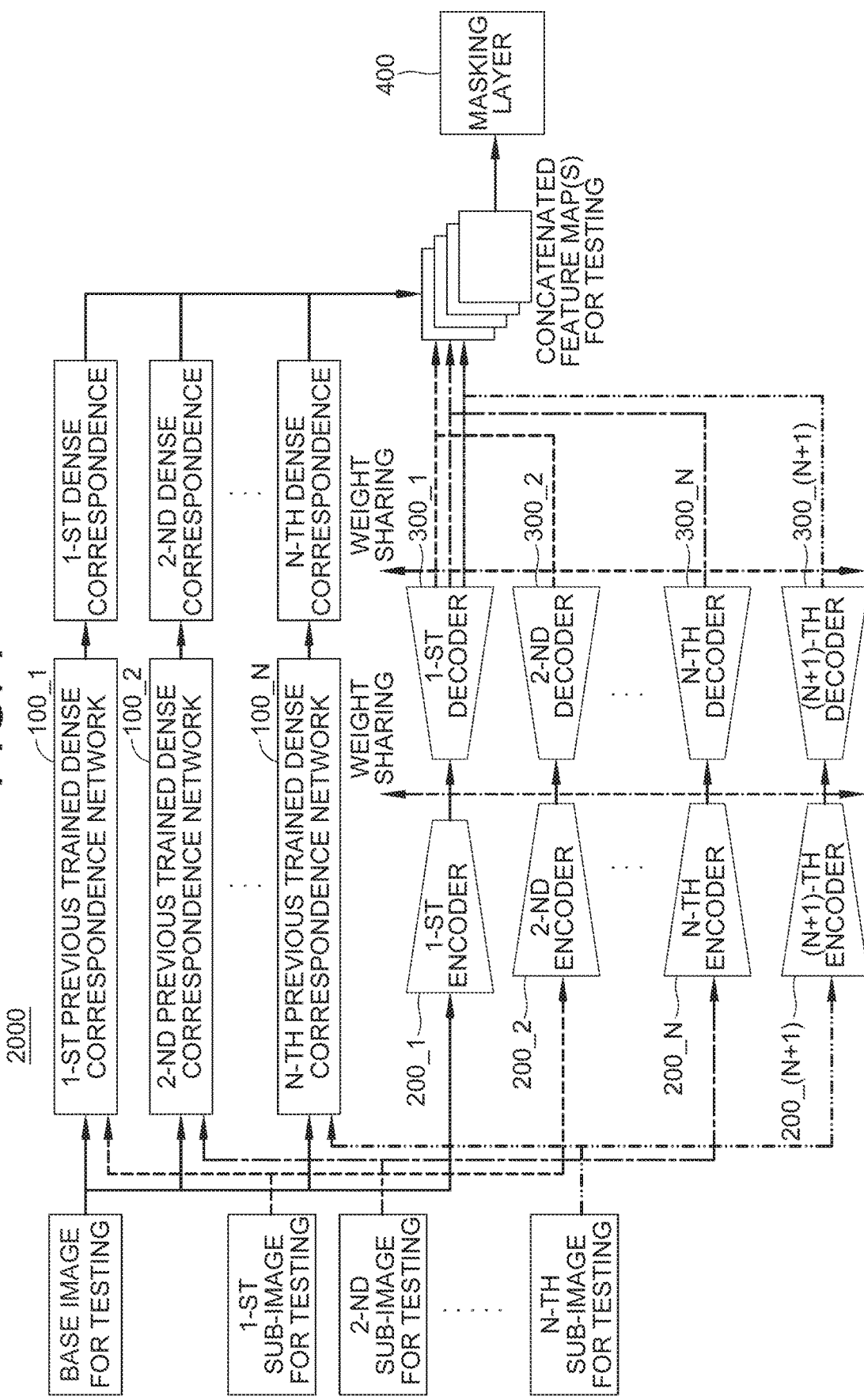
FIG. 7 is a drawing schematically illustrating a method for testing the automatic labeling device capable of auto-labeling the base image of the base vehicle by using the sub-images of the nearby vehicles in accordance with one example of the present disclosure.

A method for testing the automatic labeling device to be used for auto-labeling the base image taken from the base vehicle by using the sub-images taken from the nearby vehicles by using the testing device 2000 in accordance with one example of the present disclosure is described by referring to FIG. 7 as follows. In the description below, the part easily deducible from the explanation of FIGS. 3 to 5 will be omitted.

Figure 3:
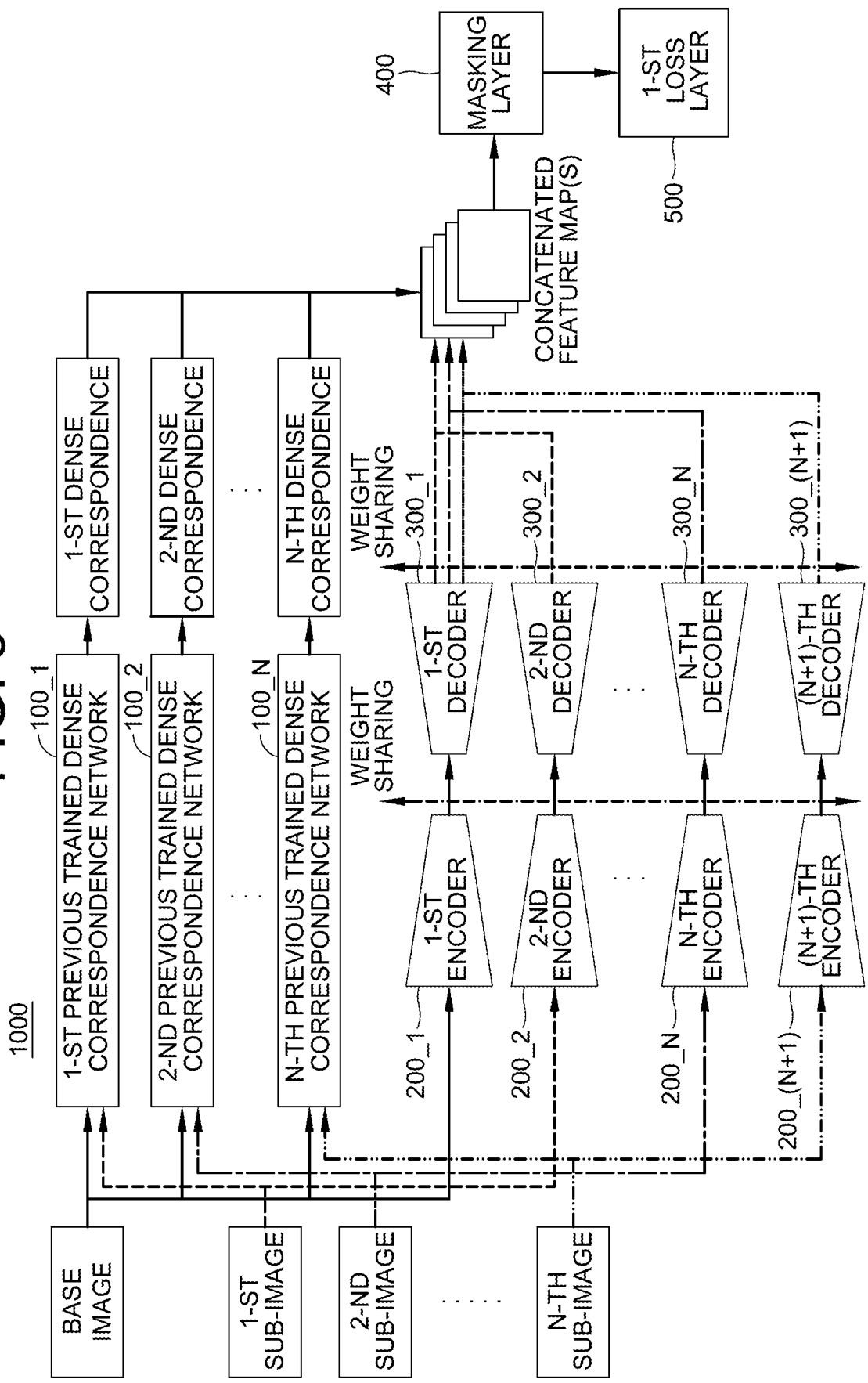
FIG. 3 is a drawing schematically illustrating a method for learning the automatic labeling device capable of auto-labeling the base image of the base vehicle by using the sub-images of the nearby vehicles in accordance with one example of the present disclosure.
Figure 4:
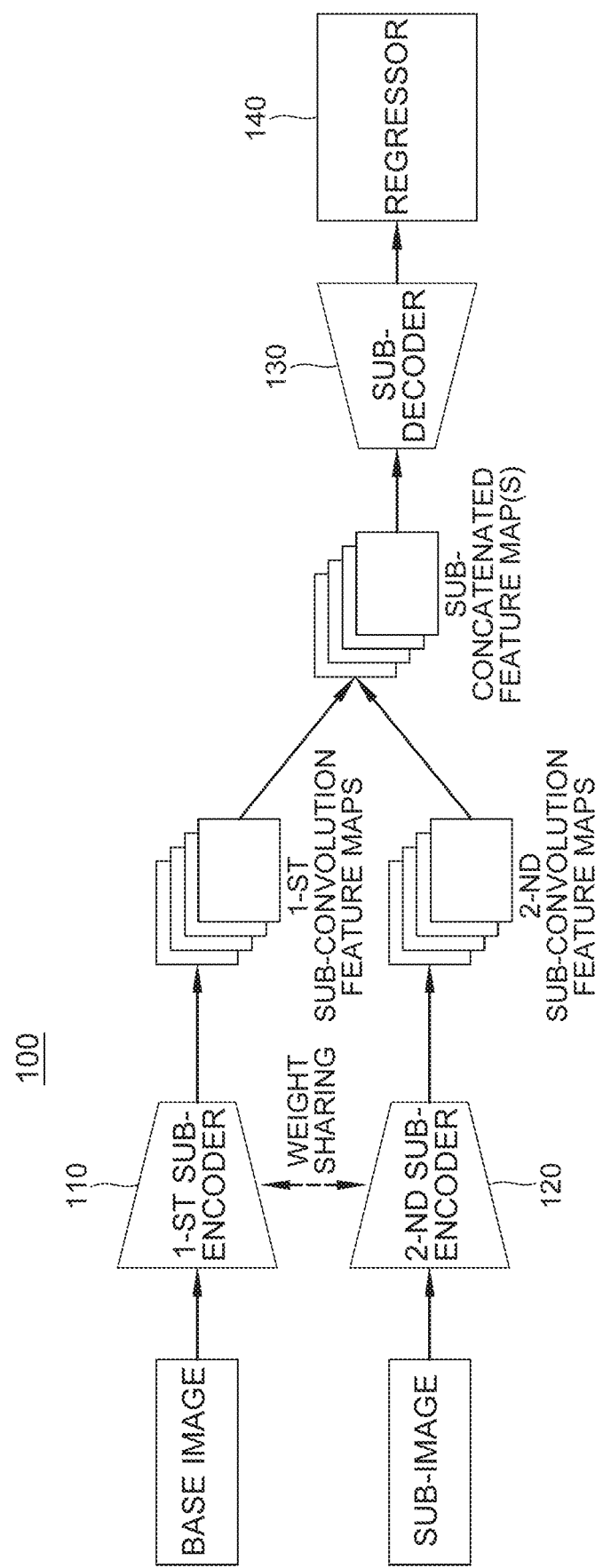
FIG. 4 is a drawing schematically illustrating a process of a previous trained dense correspondence network in the method for learning the automatic labeling device capable of auto-labeling the base image of the base vehicle by using the sub-images of the nearby vehicles in accordance with one example of the present disclosure.

First, the automatic labeling device capable of auto-labeling the base image taken from the base vehicle by using the sub-images of the nearby vehicles may have been learned by the learning processes described by referring to FIGS. 3 to 5.

That is, if at least one base image for training taken from a base vehicle for training and a 1-st sub-image for training to an n-th sub-image for training taken from respective one or more nearby vehicles for training are acquired, the learning device may perform a process of inputting the base image for training and inputting each of the 1-st sub-image for training to the n-th sub-image for training respectively into the 1-st previous trained dense correspondence network 100_1 to the n-th previous trained dense correspondence network 100_$n$, to thereby allow each of the 1-st to the n-th previous trained dense correspondence networks to respectively generate each of a 1-st dense correspondence for training to an n-th dense correspondence for training. Herein, each of the 1-st dense correspondence for training to the n-th dense correspondence for training represents each of locations, on the base image for training, of each of a dense of the 1-st sub-image for training to a dense of the n-th sub-image for training, assuming that each of the dense of the 1-st sub-image for training to the dense of the n-th sub-image for training is translated to the base image for training. Also, each of the dense of the 1-st sub-image for training to the dense of the n-th sub-image for training may represent each cluster of pixels where each object for training is estimated as located among pixels on each of the 1-st sub-image for training to the n-th sub-image for training. And, the learning device may perform (i) a process of inputting the base image for training and inputting each of the 1-st sub-image for training to the n-th sub-image for training respectively into each of the 1-st encoder 200_1 to the (n+1)-th encoder 200_($n$+1), to thereby allow each of the 1-st encoder 200_1 to the (n+1)-th encoder 200_($n$+1) to respectively output each of a 1-st convolution feature map for training to an (n+1)-th convolution feature map for training by applying at least one convolution operation to the base image for training and each of the 1-st sub-image for training to the n-th sub-image for training respectively, and (ii) a process of inputting each of the 1-st convolution feature map for training to the (n+1)-th convolution feature map for training respectively into each of the 1-st decoder 300_1 to the (n+1)-th decoder 300_($n$+1), to thereby allow each of the 1-st decoder 300_1 to the (n+1)-th decoder 300_($n$+1) to respectively output each of a 1-st deconvolution feature map for training to an (n+1)-th deconvolution feature map for training by applying at least one deconvolution operation to each of the 1-st convolution feature map for training to the (n+1)-th convolution feature map for training respectively. Thereafter, supposing that the integer k ranges from 1 to n, the learning device may perform (iii) a process of generating a k-th adjusted deconvolution feature map for training by translating coordinates of a (k+1)-th deconvolution feature map for training to coordinates of the 1-st deconvolution feature map for training by referring to a k-th dense correspondence for training, to thereby generate a 1-st adjusted deconvolution feature map for training to an n-th adjusted deconvolution feature map for training, and (iv) a process of generating at least one concatenated feature map for training by concatenating the 1-st deconvolution feature map for training and the 1-st to the n-th adjusted deconvolution feature maps for training. And, the learning device may perform a process of inputting the concatenated feature map for training into the masking layer 400, to thereby allow the masking layer 400 to output at least one semantic segmentation image for training by applying at least one masking operation to the concatenated feature map for training, and a process of instructing the 1-st loss layer to calculate the 1-st losses by referring to the semantic segmentation image for training and its corresponding at least one segmentation GT, and updating each of the decoder weights of the 1-st decoder 300_1 to the (n+1)-th decoder 300_(n+1) and each of the encoder weights of the 1-st encoder 200_1 to the (n+1)-th encoder 200_(n+1) via backpropagation using the 1-st losses such that the 1-st losses are minimized.

After completion of processes above, if at least one base image for testing taken from a base vehicle for testing and a 1-st sub-image for testing to an n-th sub-image for testing taken from respective one or more nearby vehicles for testing are acquired, the testing device 2000 may perform a process of inputting the base image for testing and inputting each of the 1-st sub-image for testing to the n-th sub-image for testing respectively into the 1-st previous trained dense correspondence network 100_1 to the n-th previous trained dense correspondence network 100_n, to thereby allow each of the 1-st to the n-th previous trained dense correspondence networks to respectively generate each of a 1-st dense correspondence for testing to an n-th dense correspondence for testing. Herein, each of the 1-st dense correspondence for testing to the n-th dense correspondence for testing represents each of locations, on the base image for testing, of each of a dense of the 1-st sub-image for testing to a dense of the n-th sub-image for testing, assuming that each of the dense of the 1-st sub-image for testing to the dense of the n-th sub-image for testing is translated to the base image for testing. Also, each of the dense of the 1-st sub-image for testing to the dense of the n-th sub-image for testing may represent each cluster of pixels where each object for testing is estimated as located among pixels on each of the 1-st sub-image for testing to the n-th sub-image for testing.

Figure 8:
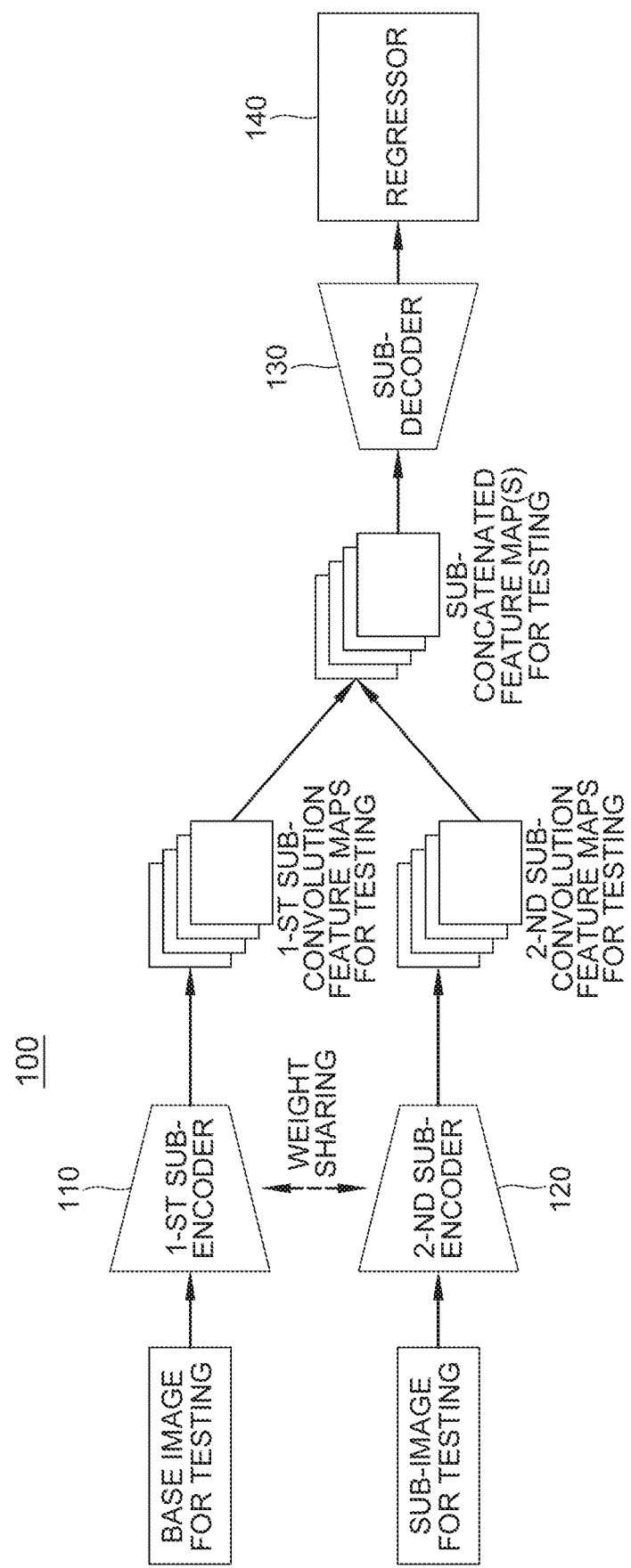
FIG. 8 is a drawing schematically illustrating a process of the previous trained dense correspondence network in the method for testing the automatic labeling device capable of auto-labeling the base image of the base vehicle by using the sub-images of the nearby vehicles in accordance with one example of the present disclosure.

That is, by referring to FIG. 8, the testing device may instruct each of the 1-st to the n-th previous trained dense correspondence networks 100_1 to 100_n to perform (i) a process of inputting the base image for testing respectively into each of the 1-st sub-encoders 110 corresponding to each of the 1-st to the n-th previous trained dense correspondence networks, to thereby allow each of the 1-st sub-encoders 110 to respectively generate each of 1-st sub-convolution feature maps for testing by applying at least one convolution operation to the base image for testing, and (ii) a process of inputting each of the 1-st to the n-th sub-images for testing respectively into each of the 2-nd sub-encoders 120 respectively corresponding to each of the 1-st to the n-th previous trained dense correspondence networks, to thereby allow each of the 2-nd sub-encoders 120 to respectively generate each of 2-nd sub-convolution feature maps for testing by applying at least one convolution operation to each of the 1-st to the n-th sub-images for testing respectively. And, the testing device may instruct each of the 1-st to the n-th previous trained dense correspondence networks 100_1 to 100_n to perform a process of concatenating each of the 1-st sub-convolution feature maps for testing and each of the 2-nd sub-convolution feature maps for testing, to thereby generate each of a 1-st to an n-th sub-concatenated feature maps for testing, and a process of inputting each of the 1-st to the n-th sub-concatenated feature maps for testing respectively into each of the sub-decoders 130 respectively corresponding to each of the 1-st to the n-th previous trained dense correspondence networks, to thereby allow each of the sub-decoders 130 to respectively generate each of a 1-st to an n-th sub-deconvolution feature maps for testing by applying at least one deconvolution operation to each of the 1-st to the n-th sub-concatenated feature maps for testing respectively. Thereafter, the testing device may instruct each of the 1-st to the n-th previous trained dense correspondence networks to respectively input the 1-st to the n-th sub-deconvolution feature maps for testing into the corresponding regressors 140, to thereby allow each of the regressors 140 to respectively output each of the 1-st to the n-th dense correspondences for testing.

Meanwhile, each of the 1-st to the n-th previous trained dense correspondence networks 100_1 to 100_n may have been learned by the sub-learning device, to respectively output each of the 1-st to the n-th dense correspondences for testing.

That is, if the 1-st training image and the 2-nd training image are acquired, the sub-learning device may perform (i) a process of inputting the 1-st training image into each of the 1-st sub-encoders 110, to thereby allow each of the 1-st sub-encoders 110 to respectively generate each of 1-st sub-convolution feature maps for training by applying at least one convolution operation to the 1-st training image, and (ii) a process of inputting the 2-nd training image into each of the 2-nd sub-encoders 120, to thereby allow each of the 2-nd sub-encoders 120 to respectively generate each of 2-nd sub-convolution feature maps for training by applying at least one convolution operation to the 2-nd training image. And, the sub-learning device may perform (iii) a process of concatenating each of the 1-st sub-convolution feature maps for training and each of the 2-nd sub-convolution feature maps for training, to thereby generate each of sub-concatenated feature maps for training, and (iv) a process of inputting each of the sub-concatenated feature maps for training into each of the sub-decoders 130, to thereby allow each of the sub-decoders 130 to respectively generate each of sub-deconvolution feature maps for training by applying at least one deconvolution operation to each of the sub-concatenated feature maps for training respectively. Thereafter, the sub-learning device may perform (v) a process of inputting each of the sub-deconvolution feature maps for training into each of the regressors 140, to thereby allow each of the regressors 140 to respectively output each of the dense correspondences for training and (vi) a process of instructing the 2-nd loss layer to calculate the 2-nd losses by referring to the dense correspondences for training and their dense correspondence GTs, and updating each of the sub-decoder weights of each of the sub-decoders 130 and each of the sub-encoder weights of each of the 1-st sub-encoders 110 and the 2-nd sub-encoders 120 via backpropagation using the 2-nd losses, and as a result, the sub-learning device may have learned the 1-st to the n-th previous trained dense correspondence networks 100_1 to 100_n.

Next, by referring to FIG. 7 again, the testing device 2000 may perform (i) a process of inputting the base image for testing and inputting each of the 1-st sub-image for testing to the n-th sub-image for testing respectively into each of the 1-st encoder 200_1 to the (n+1)-th encoder 200_(n+1), to thereby allow each of the 1-st encoder 200_1 to the (n+1)-th encoder 200_(n+1) to respectively output each of a 1-st convolution feature map for testing to an (n+1)-th convolution feature map for testing by applying at least one convolution operation to the base image for testing and each of the 1-st sub-image for testing to the n-th sub-image for testing respectively, and (ii) a process of inputting each of the 1-st convolution feature map for testing to the (n+1)-th convolution feature map for testing respectively into each of the 1-st decoder 300_1 to the (n+1)-th decoder 300_(n+1), to thereby allow each of the 1-st decoder 300_1 to the (n+1)-th decoder 300_(n+1) to respectively output each of a 1-st deconvolution feature map for testing to an (n+1)-th deconvolution feature map for testing by applying at least one deconvolution operation to each of the 1-st convolution feature map for testing to the (n+1)-th convolution feature map for testing respectively.

Next, supposing that the integer k ranges from 1 to n, the testing device 2000 may perform (iii) a process of generating a k-th adjusted deconvolution feature map for testing by translating coordinates of a (k+1)-th deconvolution feature map for testing to coordinates of the 1-st deconvolution feature map for testing by referring to a k-th dense correspondence for testing, to thereby generate a 1-st adjusted deconvolution feature map for testing to an n-th adjusted deconvolution feature map for testing, and (iv) a process of generating at least one concatenated feature map for testing by concatenating the 1-st deconvolution feature map for testing and the 1-st adjusted deconvolution feature map for testing to the n-th adjusted deconvolution feature map for testing.

Next, the testing device 2000 may perform a process of inputting the concatenated feature map for testing into the masking layer 400, to thereby allow the masking layer 400 to output at least one semantic segmentation image for testing by applying at least one masking operation to the concatenated feature map for testing, and as a result, may allow the base image to be auto-labeled.

As described above, the present disclosure shares the location sensors, etc. of the nearby vehicles using the sensor fusion, acquires the video images taken from the different perspectives via the V2X communication, fuses features of the video images taken from the different perspectives by V2X information fusion, to thereby auto-label in real-time the video images taken from traveling vehicles.

The present disclosure has an effect of performing auto-labeling in real-time while the vehicle is traveling.

The present disclosure has another effect of performing auto-labeling of high quality, by integrating and auto-labeling the video images from a traveling vehicle and the video images from the nearby vehicles.

The present disclosure has still another effect of performing auto-labeling using only the video images of cameras, without using any sensors, by integrating and auto-labeling the video images from the traveling vehicle and the video images from the nearby vehicles.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning an automatic labeling device capable of auto-labeling an image of a base vehicle using images of nearby vehicles, comprising steps of:

(a) if at least one base image of the base vehicle and a 1-st sub-image to an n-th sub-image of respective one or more nearby vehicles are acquired wherein n is an integer larger than 0, a learning device performing a process of inputting the base image and inputting each of the 1-st sub-image to the n-th sub-image respectively into a 1-st previous trained dense correspondence network to an n-th previous trained dense correspondence network, to thereby allow each of the 1-st to the n-th previous trained dense correspondence networks to respectively generate each of a 1-st dense correspondence to an n-th dense correspondence, wherein each of the 1-st dense correspondence to the n-th dense correspondence represents each of locations, on the base image, of each of a dense of the 1-st sub-image to a dense of the n-th sub-image, assuming that each of the dense of the 1-st sub-image to the dense of the n-th sub-image is translated to the base image;

(b) the learning device performing (i) a process of inputting the base image and inputting each of the 1-st sub-image to the n-th sub-image respectively into each of a 1-st encoder to an (n+1)-th encoder, to thereby allow each of the 1-st encoder to the (n+1)-th encoder to respectively output a 1-st convolution feature map to an (n+1)-th convolution feature map by applying at least one convolution operation to the base image and each of the 1-st sub-image to the n-th sub-image respectively, (ii) a process of inputting each of the 1-st convolution feature map to the (n+1)-th convolution feature map respectively into each of a 1-st decoder to an (n+1)-th decoder, to thereby allow each of the 1-st decoder to the (n+1)-th decoder to respectively output each of a 1-st deconvolution feature map to an (n+1)-th deconvolution feature map by applying at least one deconvolution operation to each of the 1-st convolution feature map to the (n+1)-th convolution feature map respectively, (iii) supposing that an integer k ranges from 1 to n, a process of generating a k-th adjusted deconvolution feature map by translating coordinates of a (k+1)-th deconvolution feature map to coordinates of the 1-st deconvolution feature map by referring to a k-th dense correspondence, to thereby generate a 1-st adjusted deconvolution feature map to an n-th adjusted deconvolution feature map, and (iv) a process of generating at least one concatenated feature map by concatenating the 1-st deconvolution feature map, and the 1-st adjusted deconvolution feature map to the n-th adjusted deconvolution feature map; and (c) the learning device performing a process of inputting the concatenated feature map into a masking layer, to thereby allow the masking layer to output at least one semantic segmentation image by applying at least one masking operation to the concatenated feature map, and a process of instructing a 1-st loss layer to calculate one or more 1-st losses by referring to the semantic segmentation image and its corresponding at least one segmentation GT, and updating each of decoder weights of the 1-st decoder to the (n+1)-th decoder and each of encoder weights of the 1-st encoder to the (n+1)-th encoder via backpropagation using the 1-st losses such that the 1-st losses are minimized.

2. The method of claim 1, wherein the learning device instructs each of the 1-st to the n-th previous trained dense correspondence networks to perform (i) a process of inputting the base image into each of 1-st sub-encoders respectively corresponding to each of the 1-st to the n-th previous trained dense correspondence networks, to thereby allow each of the 1-st sub-encoders to respectively generate each of 1-st sub-convolution feature maps by applying the convolution operation to the base image, (ii) a process of inputting each of the 1-st to the n-th sub-images into each of 2-nd sub-encoders respectively corresponding to each of the 1-st to the n-th previous trained dense correspondence networks, to thereby allow each of the 2-nd sub-encoders to respectively generate each of 2-nd sub-convolution feature maps by applying the convolution operation to each of the 1-st to the n-th sub-images respectively, (iii) a process of concatenating each of the 1-st sub-convolution feature maps and each of the 2-nd sub-convolution feature maps, to thereby generate each of the 1-st to the n-th sub-concatenated feature maps, (iv) a process of inputting each of the 1-st to the n-th sub-concatenated feature maps respectively into each of sub-decoders respectively corresponding to each of the 1-st to the n-th previous trained dense correspondence networks, to thereby allow each of the sub-decoders to respectively generate each of a 1-st to an n-th sub-deconvolution feature maps by applying the deconvolution operation to each of the 1-st to the n-th sub-concatenated feature maps respectively, and (v) a process of inputting each of the 1-st to the n-th sub-deconvolution feature maps respectively into each of regressors respectively corresponding to each of the 1-st to the n-th previous trained dense correspondence networks, to thereby allow each of the regressors to respectively output each of the 1-st to the n-th dense correspondences by applying at least one regression operation to each of the 1-st to the n-th dense correspondences respectively.

3. The method of claim 2, wherein each of the 1-st to the n-th previous trained dense correspondence networks has been learned by a sub-learning device, to respectively output each of the 1-st to the n-th dense correspondences, and wherein, if at least one 1-st training image and at least one 2-nd training image are acquired, the sub-learning device performs (i) a process of inputting the 1-st training image into each of the 1-st sub-encoders, to thereby allow each of the 1-st sub-encoders to respectively generate each of 1-st sub-convolution feature maps for training by applying the convolution operation to the 1-st training image respectively, (ii) a process of inputting the 2-nd training image into each of the 2-nd sub-encoders, to thereby allow each of the 2-nd sub-encoders to respectively generate each of 2-nd sub-convolution feature maps for training by applying the convolution operation to the 2-nd training image, (iii) a process of concatenating each of the 1-st sub-convolution feature maps for training and each of the 2-nd sub-convolution feature maps for training, to thereby generate each of sub-concatenated feature maps for training, (iv) a process of inputting each of the sub-concatenated feature maps for training respectively into each of the sub-decoders, to thereby allow each of the sub-decoders to respectively generate each of sub-deconvolution feature maps for training by applying the deconvolution operation to each of the sub-concatenated feature maps for training respectively, (v) a process of inputting each of the sub-deconvolution feature maps for training into each of the regressors, to thereby allow each of the regressors to respectively output each of dense correspondences for training wherein each of the dense correspondence for training represents each of locations, on the 1-st training image, of each of a dense of the 2-nd training image, assuming that the dense of the 2-nd training image is translated to the 1-st training image, and (vi) a process of instructing a 2-nd loss layer to calculate one or more 2-nd losses by referring to the dense correspondences for training and their dense correspondence GTs, and updating each of sub-decoder weights of each of the sub-decoders and each of sub-encoder weights of each of the 1-st sub-encoders and the 2-nd sub-encoders via backpropagation using the 2-nd losses.

4. The method of claim 2, wherein each of the 1-st sub-encoders and each of the 2-nd sub-encoders share their sub-encoder weights.

5. The method of claim 1, wherein each of the 1-st to the n-th dense correspondences includes information representing each pixel of each of the 1-st to the n-th sub-images corresponds to each certain pixel of the base image.

6. The method of claim 5, wherein each of the 1-st to the n-th dense correspondences includes information corresponding to at least one location of at least one externally expanding area of the base image, if each pixel of each of the 1-st to the n-th sub-images fails to correspond to any pixel of the base image.

7. The method of claim 1, wherein the 1-st encoder to the (n+1)-th encoder share their encoder weights, and wherein the 1-st decoder to the (n+1)-th decoder share their decoder weights.

8. A method for testing an automatic labeling device capable of auto-labeling an image of a base vehicle using an image of a nearby vehicle, comprising steps of:

(a) on condition that a learning device has performed (1) if at least one base image for training of a base vehicle for training and a 1-st sub-image for training to an n-th sub-image for training of respective one or more nearby vehicles for training are acquired wherein n is an integer larger than 0, a process of inputting the base image for training and inputting each of the 1-st sub-image for training to the n-th sub-image for training respectively into a 1-st previous trained dense correspondence network to an n-th previous trained dense correspondence network, to thereby allow each of the 1-st to the n-th previous trained dense correspondence networks to respectively generate each of a 1-st dense correspondence for training to an n-th dense correspondence for training, wherein each of the 1-st dense correspondence for training to the n-th dense correspondence for training represents each of locations, on the base image for training, of each of a dense of the 1-st sub-image for training to a dense of the n-th sub-image for training, assuming that each of the dense of the 1-st sub-image for training to the dense of the n-th sub-image for training is translated to the base image for training, (2) (i) a process of inputting the base image for training and inputting each of the 1-st sub-image for training to the n-th sub-image for training respectively into each of a 1-st encoder to an (n+1)-th encoder, to thereby allow each of the 1-st encoder to the (n+1)-th encoder to respectively output a 1-st convolution feature map for training to an (n+1)-th convolution feature map for training by applying at least one convolution operation to the base image for training and each of the 1-st sub-image for training to the n-th sub-image for training respectively, (ii) a process of inputting each of the 1-st convolution feature map for training to the (n+1)-th convolution feature map for training respectively into each of a 1-st decoder to an (n+1)-th decoder, to thereby allow each of the 1-st decoder to the (n+1)-th decoder to respectively output each of a 1-st deconvolution feature map for training to an (n+1)-th deconvolution feature map for training by applying at least one deconvolution operation to each of the 1-st convolution feature map for training to the (n+1)-th convolution feature map for training respectively, (iii) supposing that an integer k ranges from 1 to n, a process of generating a k-th adjusted deconvolution feature map for training by translating coordinates of a (k+1)-th deconvolution feature map for training to coordinates of the 1-st deconvolution feature map for training by referring to a k-th dense correspondence for training, to thereby generate a 1-st adjusted deconvolution feature map for training to an n-th adjusted deconvolution feature map for training, and (iv) a process of generating at least one concatenated feature map for training by concatenating the 1-st deconvolution feature map for training, and the 1-st adjusted deconvolution feature map for training to the n-th adjusted deconvolution feature map for training and (3) a process of inputting the concatenated feature map for training into a masking layer, to thereby allow the masking layer to output at least one semantic segmentation image for training by applying at least one masking operation to the concatenated feature map for training, and a process of instructing a 1-st loss layer to calculate one or more 1-st losses by referring to the semantic segmentation image for training and its corresponding at least one segmentation GT, and updating each of decoder weights of the 1-st decoder to the (n+1)-th decoder and each of encoder weights of the 1-st encoder to the (n+1)-th encoder via backpropagation using the 1-st losses such that the 1-st losses are minimized, a testing device, if at least one base image for testing of a base vehicle for testing and a 1-st sub-image for testing to an n-th sub-image for testing of respective one or more nearby vehicles for testing are acquired, performing a process of inputting the base image for testing and inputting each of the 1-st sub-image for testing to the n-th sub-image for testing respectively into the 1-st previous trained dense correspondence network to the n-th previous trained dense correspondence network, to thereby allow each of the 1-st to the n-th previous trained dense correspondence networks to respectively generate each of a 1-st dense correspondence for testing to an n-th dense correspondence for testing, wherein each of the 1-st dense correspondence for testing to the n-th dense correspondence for testing represents each of locations, on the base image for testing, of each of a dense of the 1-st sub-image for testing to a dense of the n-th sub-image for testing, assuming that each of the dense of the 1-st sub-image for testing to the dense of the n-th sub-image for testing is translated to the base image for testing;

(b) the testing device performing (i) a process of inputting the base image for testing and inputting each of the 1-st sub-image for testing to the n-th sub-image for testing respectively into each of the 1-st encoder to the (n+1)-th encoder, to thereby allow each of the 1-st encoder to the (n+1)-th encoder to respectively output a 1-st convolution feature map for testing to an (n+1)-th convolution feature map for testing by applying the convolution operation to the base image for testing and each of the 1-st sub-image for testing to the n-th sub-image for testing respectively, (ii) a process of inputting each of the 1-st convolution feature map for testing to the (n+1)-th convolution feature map for testing respectively into the 1-st decoder to the (n+1)-th decoder, to thereby allow the 1-st decoder to the (n+1)-th decoder to respectively output a 1-st deconvolution feature map for testing to an (n+1)-th deconvolution feature map for testing by applying the deconvolution operation to each of the 1-st convolution feature map for testing to the (n+1)-th convolution feature map for testing respectively, (iii) supposing that an integer k ranges from 1 to n, a process of generating a k-th adjusted deconvolution feature map for testing by translating coordinates of a (k+1)-th deconvolution feature map for testing to coordinates of the 1-st deconvolution feature map for testing by referring to a k-th dense correspondence for testing, to thereby generate a 1-st adjusted deconvolution feature map for testing to an n-th adjusted deconvolution feature map for testing, and (iv) a process of generating at least one concatenated feature map for testing by concatenating the 1-st deconvolution feature map for testing, and the 1-st adjusted deconvolution feature map for testing to the n-th adjusted deconvolution feature map for testing; and (c) the testing device performing a process of inputting the concatenated feature map for testing into the masking layer, to thereby allow the masking layer to output at least one semantic segmentation image for testing by applying the masking operation to the concatenated feature map for testing.

9. The method of claim 8, wherein the testing device instructs each of the 1-st to the n-th previous trained dense correspondence networks to perform (i) a process of inputting the base image for testing into each of 1-st sub-encoders respectively corresponding to each of the 1-st to the n-th previous trained dense correspondence networks, to thereby allow each of the 1-st sub-encoders to respectively generate each of 1-st sub-convolution feature maps for testing by applying the convolution operation to the base image for testing, (ii) a process of inputting each of the 1-st to the n-th sub-images for testing into each of 2-nd sub-encoders respectively corresponding to each of the 1-st to the n-th previous trained dense correspondence networks, to thereby allow each of the 2-nd sub-encoders to respectively generate each of 2-nd sub-convolution feature maps for testing by applying the convolution operation to each of the 1-st to the n-th sub-images for testing respectively, (iii) a process of concatenating each of the 1-st sub-convolution feature maps for testing and each of the 2-nd sub-convolution feature maps for testing, to thereby generate each of the 1-st to the n-th sub-concatenated feature maps for testing, (iv) a process of inputting each of the 1-st to the n-th sub-concatenated feature maps for testing respectively into each of sub-decoders corresponding to each of the 1-st to the n-th previous trained dense correspondence networks, to thereby allow each of the sub-decoders to respectively generate each of a 1-st to an n-th sub-deconvolution feature maps for testing by applying the deconvolution operation to each of the 1-st to the n-th sub-concatenated feature maps for testing respectively, and (v) a process of inputting each of the 1-st to the n-th sub-deconvolution feature maps for testing respectively into each of regressors respectively corresponding to each of the 1-st to the n-th previous trained dense correspondence networks, to thereby allow each of the regressors to respectively output each of the 1-st to the n-th dense correspondences for testing by applying at least one regression operation to each of the 1-st to the n-th dense correspondences for testing respectively.

10. The method of claim 9, wherein each of the 1-st to the n-th previous trained dense correspondence networks has been learned by a sub-learning device, to respectively output each of the 1-st to the n-th dense correspondences for testing, and
wherein, if at least one 1-st training image and at least one 2-nd training image are acquired, the sub-learning device performs (i) a process of inputting the 1-st training image into each of the 1-st sub-encoders, to thereby allow each of the 1-st sub-encoders to respectively generate each of 1-st sub-convolution feature maps for training by applying the convolution operation to the 1-st training image, (ii) a process of inputting the 2-nd training image into each of the 2-nd sub-encoders, to thereby allow each of the 2-nd sub-encoders to respectively generate each of 2-nd sub-convolution feature maps for training by applying the convolution operation to the 2-nd training image, (iii) a process of concatenating each of the 1-st sub-convolution feature maps for training and each of the 2-nd sub-convolution feature maps for training, to thereby generate each of sub-concatenated feature maps for training, (iv) a process of inputting each of the sub-concatenated feature maps for training into each of the sub-decoders, to thereby allow each of the sub-decoders to respectively generate each of sub-deconvolution feature maps for training by applying the deconvolution operation to each of the sub-concatenated feature maps for training respectively, (v) a process of inputting each of the sub-deconvolution feature maps for training into each of the regressors, to thereby allow each of the regressors to respectively output each of dense correspondences for training wherein each of the dense correspondence represents each of locations, on the 1-st training image, of the dense of the 2-nd training image, assuming that the dense of the 2-nd training image is translated to the 1-st training image, and (vi) a process of instructing a 2-nd loss layer to calculate one or more 2-nd losses by referring to the dense correspondences for training and their dense correspondence GTs, and updating each of sub-decoder weights of each of the sub-decoders and each of sub-encoder weights of each of the 1-st sub-encoders and the 2-nd sub-encoders via backpropagation using the 2-nd losses.

11. The method of claim 9, wherein each of the 1-st sub-encoders and each of the 2-nd sub-encoders share their sub-encoder weight.

12. The method of claim 8, wherein each of the 1-st to the n-th dense correspondences for testing includes information representing each pixel of each of the 1-st to the n-th sub-images for testing corresponds to each certain pixel of the base image for testing.

13. The method of claim 12, wherein each of the 1-st to the n-th dense correspondences for testing includes information corresponding to at least one location of at least one externally expanding area of the base image for testing, if each pixel of each of the 1-st to the n-th sub-images for testing fails to correspond to any pixel of the base image for testing.

14. The method of claim 8, wherein the 1-st encoder to the (n+1)-th encoder share their encoder weight, and wherein the 1-st decoder to the (n+1)-th decoder share their decoder weight.

15. A learning device for learning an automatic labeling device capable of auto-labeling an image of a base vehicle using images of nearby vehicles, comprising:
at least one memory that stores instructions; and
at least one processor configured to execute the instructions to perform or support another device to perform:
(I) if at least one base image of the base vehicle and a 1-st sub-image to an n-th sub-image of respective one or more nearby vehicles are acquired wherein n is an integer larger than 0, a process of inputting the base image and inputting each of the 1-st sub-image to the n-th sub-image respectively into a 1-st previous trained dense correspondence network to an n-th previous trained dense correspondence network, to thereby allow each of the 1-st to the n-th previous trained dense correspondence networks to respectively generate each of a 1-st dense correspondence to an n-th dense correspondence, wherein each of the 1-st dense correspondence to the n-th dense correspondence represents each of locations, on the base image, of each of a dense of the 1-st sub-image to a dense of the n-th sub-image, assuming that each of the dense of the 1-st sub-image to the dense of the n-th sub-image is translated to the base image, (II) (i) a process of inputting the base image and inputting each of the 1-st sub-image to the n-th sub-image respectively into each of a 1-st encoder to an (n+1)-th encoder, to thereby allow each of the 1-st encoder to the (n+1)-th encoder to respectively output a 1-st convolution feature map to an (n+1)-th convolution feature map by applying at least one convolution operation to the base image and each of the 1-st sub-image to the n-th sub-image respectively, (ii) a process of inputting each of the 1-st convolution feature map to the (n+1)-th convolution feature map respectively into each of a 1-st decoder to an (n+1)-th decoder, to thereby allow each of the 1-st decoder to the (n+1)-th decoder to respectively output each of a 1-st deconvolution feature map to an (n+1)-th deconvolution feature map by applying at least one deconvolution operation to each of the 1-st convolution feature map to the (n+1)-th convolution feature map respectively, (iii) supposing that an integer k ranges from 1 to n, a process of generating a k-th adjusted deconvolution feature map by translating coordinates of a (k+1)-th deconvolution feature map to coordinates of the 1-st deconvolution feature map by referring to a k-th dense correspondence, to thereby generate a 1-st adjusted deconvolution feature map to an n-th adjusted deconvolution feature map, and (iv) a process of generating at least one concatenated feature map by concatenating the 1-st deconvolution feature map, and the 1-st adjusted deconvolution feature map to the n-th adjusted deconvolution feature map, and (III) a process of inputting the concatenated feature map into a masking layer, to thereby allow the masking layer to output at least one semantic segmentation image by applying at least one masking operation to the concatenated feature map, and a process of instructing a 1-st loss layer to calculate one or more 1-st losses by referring to the semantic segmentation image and its corresponding at least one segmentation GT, and updating each of decoder weights of the 1-st decoder to the (n+1)-th decoder and each of encoder weights of the 1-st encoder to the (n+1)-th encoder via backpropagation using the 1-st losses such that the 1-st losses are minimized.

16. The learning device of claim 15, wherein the processor instructs each of the 1-st to the n-th previous trained dense correspondence networks to perform (i) a process of inputting the base image into each of 1-st sub-encoders respectively corresponding to each of the 1-st to the n-th previous trained dense correspondence networks, to thereby allow each of the 1-st sub-encoders to respectively generate each of 1-st sub-convolution feature maps by applying the convolution operation to the base image, (ii) a process of inputting each of the 1-st to the n-th sub-images into each of 2-nd sub-encoders respectively corresponding to each of the 1-st to the n-th previous trained dense correspondence networks, to thereby allow each of the 2-nd sub-encoders to respectively generate each of 2-nd sub-convolution feature maps by applying the convolution operation to each of the 1-st to the n-th sub-images respectively, (iii) a process of concatenating each of the 1-st sub-convolution feature maps and each of the 2-nd sub-convolution feature maps, to thereby generate each of the 1-st to the n-th sub-concatenated feature maps, (iv) a process of inputting each of the 1-st to the n-th sub-concatenated feature maps respectively into each of sub-decoders respectively corresponding to each of the 1-st to the n-th previous trained dense correspondence networks, to thereby allow each of the sub-decoders to respectively generate each of a 1-st to an n-th sub-deconvolution feature maps by applying the deconvolution operation to each of the 1-st to the n-th sub-concatenated feature maps respectively, and (v) a process of inputting each of the 1-st to the n-th sub-deconvolution feature maps respectively into each of regressors respectively corresponding to each of the 1-st to the n-th previous trained dense correspondence networks, to thereby allow each of the regressors to respectively output each of the 1-st to the n-th dense correspondences by applying at least one regression operation to each of the 1-st to the n-th dense correspondences respectively.

17. The learning device of claim 16, wherein each of the 1-st to the n-th previous trained dense correspondence networks has been learned by a sub-learning device, to respectively output each of the 1-st to the n-th dense correspondences, and
wherein, if at least one 1-st training image and at least one 2-nd training image are acquired, the sub-learning device performs (i) a process of inputting the 1-st training image into each of the 1-st sub-encoders, to thereby allow each of the 1-st sub-encoders to respectively generate each of 1-st sub-convolution feature maps for training by applying the convolution operation to the 1-st training image respectively, (ii) a process of inputting the 2-nd training image into each of the 2-nd sub-encoders, to thereby allow each of the 2-nd sub-encoders to respectively generate each of 2-nd sub-convolution feature maps for training by applying the convolution operation to the 2-nd training image, (iii) a process of concatenating each of the 1-st sub-convolution feature maps for training and each of the 2-nd sub-convolution feature maps for training, to thereby generate each of sub-concatenated feature maps for training, (iv) a process of inputting each of the sub-concatenated feature maps for training respectively into each of the sub-decoders, to thereby allow each of the sub-decoders to respectively generate each of sub-deconvolution feature maps for training by applying the deconvolution operation to each of the sub-concatenated feature maps for training respectively, (v) a process of inputting each of the sub-deconvolution feature maps for training into each of the regressors, to thereby allow each of the regressors to respectively output each of dense correspondences for training wherein each of the dense correspondence for training represents each of locations, on the 1-st training image, of each of a dense of the 2-nd training image, assuming that the dense of the 2-nd training image is translated to the 1-st training image, and (vi) a process of instructing a 2-nd loss layer to calculate one or more 2-nd losses by referring to the dense correspondences for training and their dense correspondence GTs, and updating each of sub-decoder weights of each of the sub-decoders and each of sub-encoder weights of each of the 1-st sub-encoders and the 2-nd sub-encoders via backpropagation using the 2-nd losses.

18. The learning device of claim 16, wherein each of the 1-st sub-encoders and each of the 2-nd sub-encoders share their sub-encoder weights.

19. The learning device of claim 15, wherein each of the 1-st to the n-th dense correspondences includes information representing each pixel of each of the 1-st to the n-th sub-images corresponds to each certain pixel of the base image.

20. The learning device of claim 19, wherein each of the 1-st to the n-th dense correspondences includes information corresponding to at least one location of at least one externally expanding area of the base image, if each pixel of each of the 1-st to the n-th sub-images fails to correspond to any pixel of the base image.

21. The learning device of claim 15, wherein the 1-st encoder to the (n+1)-th encoder share their encoder weights, and wherein the 1-st decoder to the (n+1)-th decoder share their decoder weights.

22. A testing device for testing an automatic labeling device capable of auto-labeling an image of a base vehicle using an image of a nearby vehicle, comprising:
at least one memory that stores instructions; and
at least one processor configured to execute the instructions to perform or support another device to perform:
(I) on condition that a learning device has performed (1) if at least one base image for training of a base vehicle for training and a 1-st sub-image for training to an n-th sub-image for training of respective one or more nearby vehicles for training are acquired wherein n is an integer larger than 0, a process of inputting the base image for training and inputting each of the 1-st sub-image for training to the n-th sub-image for training respectively into a 1-st previous trained dense correspondence network to an n-th previous trained dense correspondence network, to thereby allow each of the 1-st to the n-th previous trained dense correspondence networks to respectively generate each of a 1-st dense correspondence for training to an n-th dense correspondence for training, wherein each of the 1-st dense correspondence for training to the n-th dense correspondence for training represents each of locations, on the base image for training, of each of a dense of the 1-st sub-image for training to a dense of the n-th sub-image for training, assuming that each of the dense of the 1-st sub-image for training to the dense of the n-th sub-image for training is translated to the base image for training, (2) (i) a process of inputting the base image for training and inputting each of the 1-st sub-image for training to the n-th sub-image for training respectively into each of a 1-st encoder to an (n+1)-th encoder, to thereby allow each of the 1-st encoder to the (n+1)-th encoder to respectively output a 1-st convolution feature map for training to an (n+1)-th convolution feature map for training by applying at least one convolution operation to the base image for training and each of the 1-st sub-image for training to the n-th sub-image for training respectively, (ii) a process of inputting each of the 1-st convolution feature map for training to the (n+1)-th convolution feature map for training respectively into each of a 1-st decoder to an (n+1)-th decoder, to thereby allow each of the 1-st decoder to the (n+1)-th decoder to respectively output each of a 1-st deconvolution feature map for training to an (n+1)-th deconvolution feature map for training by applying at least one deconvolution operation to each of the 1-st convolution feature map for training to the (n+1)-th convolution feature map for training respectively, (iii) supposing that an integer k ranges from 1 to n, a process of generating a k-th adjusted deconvolution feature map for training by translating coordinates of a (k+1)-th deconvolution feature map for training to coordinates of the 1-st deconvolution feature map for training by referring to a k-th dense correspondence for training, to thereby generate a 1-st adjusted deconvolution feature map for training to an n-th adjusted deconvolution feature map for training, and (iv) a process of generating at least one concatenated feature map for training by concatenating the 1-st deconvolution feature map for training, and the 1-st adjusted deconvolution feature map for training to the n-th adjusted deconvolution feature map for training and (3) a process of inputting the concatenated feature map for training into a masking layer, to thereby allow the masking layer to output at least one semantic segmentation image for training by applying at least one masking operation to the concatenated feature map for training, and a process of instructing a 1-st loss layer to calculate one or more 1-st losses by referring to the semantic segmentation image for training and its corresponding at least one segmentation GT, and updating each of decoder weights of the 1-st decoder to the (n+1)-th decoder and each of encoder weights of the 1-st encoder to the (n+1)-th encoder via backpropagation using the 1-st losses such that the 1-st losses are minimized, (I-1) if at least one base image for testing of a base vehicle for testing and a 1-st sub-image for testing to an n-th sub-image for testing of respective one or more nearby vehicles for testing are acquired, a process of inputting the base image for testing and inputting each of the 1-st sub-image for testing to the n-th sub-image for testing respectively into the 1-st previous trained dense correspondence network to the n-th previous trained dense correspondence network, to thereby allow each of the 1-st to the n-th previous trained dense correspondence networks to respectively generate each of a 1-st dense correspondence for testing to an n-th dense correspondence for testing, wherein each of the 1-st dense correspondence for testing to the n-th dense correspondence for testing represents each of locations, on the base image for testing, of each of a dense of the 1-st sub-image for testing to a dense of the n-th sub-image for testing, assuming that each of the dense of the 1-st sub-image for testing to the dense of the n-th sub-image for testing is translated to the base image for testing, (II) (II-1) a process of inputting the base image for testing and inputting each of the 1-st sub-image for testing to the n-th sub-image for testing respectively into each of the 1-st encoder to the (n+1)-th encoder, to thereby allow each of the 1-st encoder to the (n+1)-th encoder to respectively output a 1-st convolution feature map for testing to an (n+1)-th convolution feature map for testing by applying the convolution operation to the base image for testing and each of the 1-st sub-image for testing to the n-th sub-image for testing respectively, (II-2) a process of inputting each of the 1-st convolution feature map for testing to the (n+1)-th convolution feature map for testing respectively into the 1-st decoder to the (n+1)-th decoder, to thereby allow the 1-st decoder to the (n+1)-th decoder to respectively output a 1-st deconvolution feature map for testing to an (n+1)-th deconvolution feature map for testing by applying the deconvolution operation to each of the 1-st convolution feature map for testing to the (n+1)-th convolution feature map for testing respectively, (II-3) supposing that an integer k ranges from 1 to n, a process of generating a k-th adjusted deconvolution feature map for testing by translating coordinates of a (k+1)-th deconvolution feature map for testing to coordinates of the 1-st deconvolution feature map for testing by referring to a k-th dense correspondence for testing, to thereby generate a 1-st adjusted deconvolution feature map for testing to an n-th adjusted deconvolution feature map for testing, and (II-4) a process of generating at least one concatenated feature map for testing by concatenating the 1-st deconvolution feature map for testing, and the 1-st adjusted deconvolution feature map for testing to the n-th adjusted deconvolution feature map for testing, and (III) a process of inputting the concatenated feature map for testing into the masking layer, to thereby allow the masking layer to output at least one semantic segmentation image for testing by applying the masking operation to the concatenated feature map for testing.

23. The testing device of claim 22, wherein the processor instructs each of the 1-st to the n-th previous trained dense correspondence networks to perform (i) a process of inputting the base image for testing into each of 1-st sub-encoders respectively corresponding to each of the 1-st to the n-th previous trained dense correspondence networks, to thereby allow each of the 1-st sub-encoders to respectively generate each of 1-st sub-convolution feature maps for testing by applying the convolution operation to the base image for testing, (ii) a process of inputting each of the 1-st to the n-th sub-images for testing into each of 2-nd sub-encoders respectively corresponding to each of the 1-st to the n-th previous trained dense correspondence networks, to thereby allow each of the 2-nd sub-encoders to respectively generate each of 2-nd sub-convolution feature maps for testing by applying the convolution operation to each of the 1-st to the n-th sub-images for testing respectively, (iii) a process of concatenating each of the 1-st sub-convolution feature maps for testing and each of the 2-nd sub-convolution feature maps for testing, to thereby generate each of the 1-st to the n-th sub-concatenated feature maps for testing, (iv) a process of inputting each of the 1-st to the n-th sub-concatenated feature maps for testing respectively into each of sub-decoders corresponding to each of the 1-st to the n-th previous trained dense correspondence networks, to thereby allow each of the sub-decoders to respectively generate each of a 1-st to an n-th sub-deconvolution feature maps for testing by applying the deconvolution operation to each of the 1-st to the n-th sub-concatenated feature maps for testing respectively, and (v) a process of inputting each of the 1-st to the n-th sub-deconvolution feature maps for testing respectively into each of regressors respectively corresponding to each of the 1-st to the n-th previous trained dense correspondence networks, to thereby allow each of the regressors to respectively output each of the 1-st to the n-th dense correspondences for testing by applying at least one regression operation to each of the 1-st to the n-th dense correspondences for testing respectively.

24. The testing device of claim 23, wherein each of the 1-st to the n-th previous trained dense correspondence networks has been learned by a sub-learning device, to respectively output each of the 1-st to the n-th dense correspondences for testing, and wherein, if at least one 1-st training image and at least one 2-nd training image are acquired, the sub-learning device performs (i) a process of inputting the 1-st training image into each of the 1-st sub-encoders, to thereby allow each of the 1-st sub-encoders to respectively generate each of 1-st sub-convolution feature maps for training by applying the convolution operation to the 1-st training image, (ii) a process of inputting the 2-nd training image into each of the 2-nd sub-encoders, to thereby allow each of the 2-nd sub-encoders to respectively generate each of 2-nd sub-convolution feature maps for training by applying the convolution operation to the 2-nd training image, (iii) a process of concatenating each of the 1-st sub-convolution feature maps for training and each of the 2-nd sub-convolution feature maps for training, to thereby generate each of sub-concatenated feature maps for training, (iv) a process of inputting each of the sub-concatenated feature maps for training into each of the sub-decoders, to thereby allow each of the sub-decoders to respectively generate each of sub-deconvolution feature maps for training by applying the deconvolution operation to each of the sub-concatenated feature maps for training respectively, (v) a process of inputting each of the sub-deconvolution feature maps for training into each of the regressors, to thereby allow each of the regressors to respectively output each of dense correspondences for training wherein each of the dense correspondence represents each of locations, on the 1-st training image, of the dense of the 2-nd training image, assuming that the dense of the 2-nd training image is translated to the 1-st training image, and (vi) a process of instructing a 2-nd loss layer to calculate one or more 2-nd losses by referring to the dense correspondences for training and their dense correspondence GTs, and updating each of sub-decoder weights of each of the sub-decoders and each of sub-encoder weights of each of the 1-st sub-encoders and the 2-nd sub-encoders via backpropagation using the 2-nd losses.

25. The testing device of claim 23, wherein each of the 1-st sub-encoders and each of the 2-nd sub-encoders share their sub-encoder weight.

26. The testing device of claim 22, wherein each of the 1-st to the n-th dense correspondences for testing includes information representing each pixel of each of the 1-st to the n-th sub-images for testing corresponds to each certain pixel of the base image for testing.

27. The method of claim 26, wherein each of the 1-st to the n-th dense correspondences for testing includes information corresponding to at least one location of at least one externally expanding area of the base image for testing, if each pixel of each of the 1-st to the n-th sub-images for testing fails to correspond to any pixel of the base image for testing.

28. The testing device of claim 22, wherein the 1-st encoder to the (n+1)-th encoder share their encoder weight, and wherein the 1-st decoder to the (n+1)-th decoder share their decoder weight.

* * * * *